US012802006B2

(12) United States Patent
Bergher et al.

(10) Patent No.: US 12,802,006 B2
(45) Date of Patent: Nov. 17, 2026

(54) DATA TRACKING AND GENERATION FOR WORKFORCE MANAGEMENT

(71) Applicant: GLADLY SOFTWARE, INC., San Francisco, CA (US)

(72) Inventors: Bruno Bergher, San Francisco, CA (US); Cathryn Herbst, San Francisco, CA (US); Alex Tsibulya, San Francisco, CA (US); Dominic Bueno, San Francisco, CA (US); Takahiro Mark Kuba, San Francisco, CA (US); Michael Hicks, San Francisco, CA (US)

(73) Assignee: GLADLY SOFTWARE, INC., San Francisco, CA (US)

( * ) Notice: Subject to any disclaimer, the term of this patent is extended or adjusted under 35 U.S.C. 154(b) by 0 days.

(21) Appl. No.: 17/143,978

(22) Filed: Jan. 7, 2021

(65) Prior Publication Data

US 2022/0215324 A1 Jul. 7, 2022

(51) Int. Cl.

*G06Q 10/0631* (2023.01)
*G06Q 10/0633* (2023.01)
*G06Q 10/1091* (2023.01)
*H04M 3/51* (2006.01)

(52) U.S. Cl.

CPC . *G06Q 10/063114* (2013.01); *G06Q 10/0633* (2013.01); *G06Q 10/1091* (2013.01); *H04M 3/5175* (2013.01)

(58) Field of Classification Search

CPC ....... G06Q 10/063114; G06Q 10/0633; G06Q 10/1091; G06Q 30/0201; G06Q 10/06312; G06Q 10/633; H04M 3/5175

USPC ................................ 705/7.15, 7.27; 715/761

See application file for complete search history.

(56) References Cited

U.S. PATENT DOCUMENTS

| | | | | |
|---|---|---|---|---|
| 6,058,163 | A * | 5/2000 | Pattison | H04M 3/36 379/265.06 |
| 10,958,786 | B1 * | 3/2021 | Nilsen | H04M 3/42042 |
| 11,783,246 | B2 * | 10/2023 | Lawrence | H04M 3/5175 705/7.15 |
| 2005/0105712 | A1 * | 5/2005 | Williams | G10L 13/027 704/275 |
| 2010/0095360 | A1 * | 4/2010 | Pavlovski | H04L 63/12 726/7 |
| 2014/0089822 | A1 * | 3/2014 | Wu | G06F 3/04817 715/761 |
| 2014/0094159 | A1 * | 4/2014 | Raleigh | H04W 24/02 455/418 |

(Continued)

FOREIGN PATENT DOCUMENTS

| | | | | |
|---|---|---|---|---|
| EP | 3761624 | A2 * | 1/2021 | H04M 3/42068 |
| FR | 3516857 | A1 * | 7/2019 | H04M 3/51 |

*Primary Examiner* — Beth V Boswell
*Assistant Examiner* — Stephen S Swartz
(74) *Attorney, Agent, or Firm* — Womble Bond Dickinson (US) LLP

(57) ABSTRACT

A method and related system provide for data tracking and generation for workforce management. The system has a database and tracks customers and conversations customers have with agents. The system tracks contact items each having a contact type and a channel. The system tracks work sessions each having one or more work bursts, based on tracking conversations and contact items. The system provides access to the database for users, reports or workforce management systems.

30 Claims, 28 Drawing Sheets

(56) References Cited

U.S. PATENT DOCUMENTS

| | | | | |
|---|---|---|---|---|
| 2015/0056964 | A1* | 2/2015 | Williams | H04M 3/5238 455/414.1 |
| 2019/0253556 | A1* | 8/2019 | Nadalin | H04L 12/1831 |
| 2020/0244807 | A1* | 7/2020 | Apshankar | H04M 3/5233 |
| 2020/0349581 | A1* | 11/2020 | Petluru | G06Q 30/016 |
| 2021/0110327 | A1* | 4/2021 | Bellet | G06Q 10/10 |
| 2021/0158235 | A1* | 5/2021 | Sivasubramanian | G06F 16/685 |
| 2021/0218840 | A1* | 7/2021 | Chishti | H04M 3/5175 |
| 2022/0215324 | A1* | 7/2022 | Bergher | H04M 3/5175 |

* cited by examiner

200

| Agents (201) | Customer (202) | Scoring Pair (203) |
|---|---|---|
| 1 | 3 | 14 |
| 2 | 3 | 14 |
| 3 | 3 | 12 |
| 4 | 3 | **16** ← Highest Scoring Pair |
| 5 | 3 | 14 |

FIG. 2A

205

| Agents (206) | Previously Contacted Customer (207) | Language(s) (208) | Expertise (209) |
|---|---|---|---|
| 1 Salvatore | None | Spanish | Products |
| 2 Gina | 3 | English, Spanish | Billing |
| 3 Terry | None | English | Billing |
| 4 Jean-Michel | 3, 5 | English | Products |
| 5 Ling | None | English | Products |

FIG. 2B

210

| | | | | | | | |
|---|---|---|---|---|---|---|---|
| 211 | 212 | 213 | 214 | 215 | 216 | 217 | 218 |
| **Customers** | **Name** | **Channel** | **Minutes Waiting** | **Status** | **Language(s)** | **Snowstorm** | **Issue area** |
| 1 | Ingrid | Text | 0.5 | Premium | English | No | Billing |
| 2 | Maria | SMS | 7 | None | Spanish | No | Billing |
| 3 | Jose | Email | 10 | None | English, Spanish | Yes | Products |
| 4 | Jeannette | Phone | 15 | Basic | Spanish | No | Billing |
| 5 | Antoine | Phone | 4 | None | English | No | Unknown |

FIG. 2C

220

221

Attributes Selected Agent:

| | |
|---|---|
| Agent Name | Salvatore |
| Agent ID | 1 |
| Previously contacted customer ID(s) | None |
| Language(s) | Spanish |
| Expertise | Products |

222

Attributes Matched Customer:

| | |
|---|---|
| Customer Name | Jose |
| Customer ID | 3 |
| Channel | Email |
| Minutes waiting | 10 |
| Status | None |
| Language(s) | English,Spanish |
| Snowstorm Impact | Yes, Extreme |
| Issue area | Products |

223

Scoring Pair For All Customers:

| | |
|---|---|
| Ingrid | 2 |
| Maria | 3 |
| Jose | 14 |
| Jeannette | 7 |
| Antoine | 1 |

224

Highest Scoring Pair Calculation: 14

| *Matched Attributes:* | *Matched Attribute Subscores:* |
|---|---|
| Snowstorm Impact | 10 |
| Same Language | 2 |
| Subject Matter Expertise | 2 |

FIG. 2D

225

| 226 Criteria ID | 227 Name | 228 Boolean | 229 Attribute | 230 Operator | 231 Desired | 232 Importance toRouting |
|---|---|---|---|---|---|---|
| 1 | Previous Contact | | Agent: Previously contacted customer ID(s) | INCLUDES | Customer: ID | Medium |
| 2 | Premium Status | | Customer: Status | = | Premium | Low |
| 3 | Snowstorm Impact | | Customer: Snowstorm impact | = | Yes | Extreme |
| 4 | Some Wait | AND | Customer: Time waiting (min) | >= | 4 | Low |
| | | AND | Customer: Time waiting (min) | < | 11 | |
| 5 | Long Wait | | Customer: Time waiting (min) | >= | 11 | High |
| 6 | Same Language | AND | Customer: Language | = | English | Medium |
| | | | Agent: Language | = | English | |
| | | OR | | | | |
| | | AND | Customer: Language | = | Spanish | |
| | | | Agent: Language | = | Spanish | |
| 7 | Subject Matter Expertise | AND | Customer: Issue area | = | Billing | Medium |
| | | | Agent: Expertise | = | Billing | |
| | | OR | | | | |
| | | AND | Customer: Issue area | = | Products | |
| | | | Agent: Expertise | = | Products | |
| | | OR | | | | |
| | | AND | Customer: Issue area | = | Tech/Website | |
| | | | Agent: Expertise | = | Tech/Website | |

FIG. 2E

240

241 Pair to evaluate

Agent: 1 Customer: 3

243 Criteria T/F

| Criterion ID | Criterion Name | T/F | Score |
|---|---|---|---|
| 1 | Previous Contact | FALSE | |
| 2 | Premium Status | FALSE | |
| 3 | Snowstorm Impact | TRUE | 10 |
| 4 | Some Wait | FALSE | |
| 5 | Long Wait | FALSE | |
| 6 | Same Language | TRUE | 2 |
| 7 | Subject Matter Expertise | TRUE | 2 |

242 Temporary Data Store

| | |
|---|---|
| Agent Name | Salvatore |
| Previously contacted customer ID(s) | None |
| Language(s) | Spanish |
| Expertise | Products |
| Customer Name | Jose |
| Channel | Email |
| Minutes waiting | 10 |
| Status | None |
| Language(s) | English,Spanish |
| Snowstorm Impact? | Yes |
| Issue area | Products |

Total Score for this Pair: 14

FIG. 2F

DATABASE 1444
TAGS 1502

| CUSTOMER ID 1504 | CONVERSATION ID 1505 (≥1 CONVERSATION PER CUSTOMER) | CONVERSATION ITEM ID 1506 (e.g., ≥1 CONVERSATION ITEM PER CONVERSATION) | CONVERSATION TYPE 1508 | CHANNEL 1510 | DIRECTION 1512 | BEGIN TIME 1514 | END TIME 1516 | SLA 1518 | STATUS 1520 | AGENT ID 1522 | INBOX ID 1524 |
|---|---|---|---|---|---|---|---|---|---|---|---|
| | | | PHONE CALL | VOICE CHANNEL ID | TO/FROM CUSTOMER AGENT | TO/FROM CUSTOMER AGENT | | | | | |
| | | | TEXT MESSAGE | TEXT CHANNEL ID | | | | | | | |
| | | | VOICE MESSAGE | VOICEMAIL CHANNEL ID | | | | | | | |
| | | | EMAIL | EMAIL CHANNEL ID | | | | | | | |
| | | | TEXT CHAT | CHAT CHANNEL ID | | | | | | | |
| | | | VIDEO CHAT | VIDEO CHAT CHANNEL ID | | | | | | | |

FIG. 15

DATA TRACKING AND GENERATION FOR WORKFORCE MANAGEMENT

FIELD

Embodiments and examples of the present invention relate to contact centers and data processing. More particularly, embodiments of the present invention relate to systems and methods for data tracking and generation for workforce management.

BACKGROUND

Today, entities or companies provide customer service using a contact center. For instance, a customer can contact a contact center that routes the contact to an available agent for servicing the customer. A conventional contact center can use skill-based routing to route contacts from a customer based on the skills of the agent. For example, a customer may indicate a need to cancel a credit card that was stolen, and be placed in a queue serviced by an agent experienced with canceling credit cards.

Furthermore, contact centers provide service to customers on multiple communication channels, e.g., telephone contacts, emails, text messages, short message service (SMS) messages, social media, etc. Contact centers should also be flexible to adjust the routing of different contacts on multiple communication channels to appropriate agents based on any number of reasons to improve customer service. For example, a customer may have used SMS messaging to start a communication with a contact center, but realizes that sending texts is cumbersome and speaking with an agent directly would be more effective.

Prior to the existence of the Internet and cell phones, before email, text messages, instant messaging, online chats, online video chats, etc., call centers handled telephone contacts between customers and agents. A primary concern was whether the call center had the correct number of people (agents) to handle the volume of telephones and customer calls. If there were two few agents to handle the call volume, customers would not get the level of service that would leave them with a favorable impression of the company. If there were too many agents to handle the call volume, the company would end up with unnecessary spending to cover the cost of the agents that were not necessary to handle the call volume.

Now, however, contact centers handle so many types of contact between customers and agents on so many different types of channels, there is a much larger volume and variety of customer-agent contact. Concerns about staffing a contact center are more difficult and less straightforward to address than when a call center only had to deal with telephone calls. Furthermore, agents can handle more contacts at the same time in an efficient manner where such was not the case with telephone calls. For example, an agent can be handling multiple chat and/or emails sessions with different customers simultaneously. Thus, because of the types of contacts that are possible for a call center today, performing workforce management to determine staffing for a call center is much more difficult. Recently, workforce management (WFM) software and systems have been developed and become commercially available to meet some of these concerns. Yet, there is a need for improvements in the art.

SUMMARY

Systems and methods for tracking and generating data for workforce management are disclosed. In one embodiment, the workforce management is customer-focused workforce management.

One embodiment is a method for generating data for use in workforce management. The method is performed by a processor-based system. The method includes identifying one or more contact items within each of one or more conversations between one or more customers contacting a contact center and one or more agents associated with the contact center. Each contact item is tagged with a contact type and a channel type. Periods of agent activity are tracked for each channel for each agent. The tracked data is sent to a workforce management system or other system.

One embodiment is a tangible, non-transitory, computer readable media. The media has instructions. When the instructions are executed by a processor, the processor performs operations. The operations include identifying one or more contact items within each of one or more conversations that are between one or more customers contacting a contact center and one or more agents associated with the contact center. Each contact item is tagged with a contact type and a channel type. The channel type is selected from multiple channel types. Periods of agent activity are tracked for each channel for each agent. This tracking uses the tagging of the contact items for one or more work sessions. The tracked data is sent to a workforce management system.

One embodiment is a system. The system has a database in a memory, and one or more processors. The one or more processors are to identify one or more contact items within each conversation between one or more customers contacting a contact center and one or more agents associated with the contact center. The one or more processors are to tag each contact item with a contact type and a channel type. The one or more processors are to track periods of agent activity for each channel for each agent. The periods of agent activity are tracked using the tagging of the contact items for one or more work sessions. The one or more processors are to send the tracked data to a workforce management system.

Other methods, systems, and computer readable-mediums are described.

BRIEF DESCRIPTION OF THE DRAWINGS

The appended drawings illustrate examples and embodiments and are, therefore, exemplary and not considered to be limiting in scope.

FIG. 2A illustrates one embodiment of a routing database table matching agents to customers based on a highest scoring pair.

FIG. 2B illustrates one embodiment of a routing database table showing attributes for agents.

FIG. 2C illustrates one embodiment of a routing database table showing attributes for customers.

FIG. 2D illustrates one embodiment of a routing database table showing scoring based on customer and agent attributes of FIG. 2C.

FIG. 2E illustrates one embodiment of a routing database table showing a list of criteria to match agents with customers along with relative importance of those criteria to scoring.

FIG. 2F illustrates one embodiment of a routing database table showing a scenario of evaluating an agent and customer according to the criteria of FIG. 2E.

FIG. 15 illustrates one embodiment of the database for in the workforce management system of FIG. 14.

DETAILED DESCRIPTION

Figure 1A:
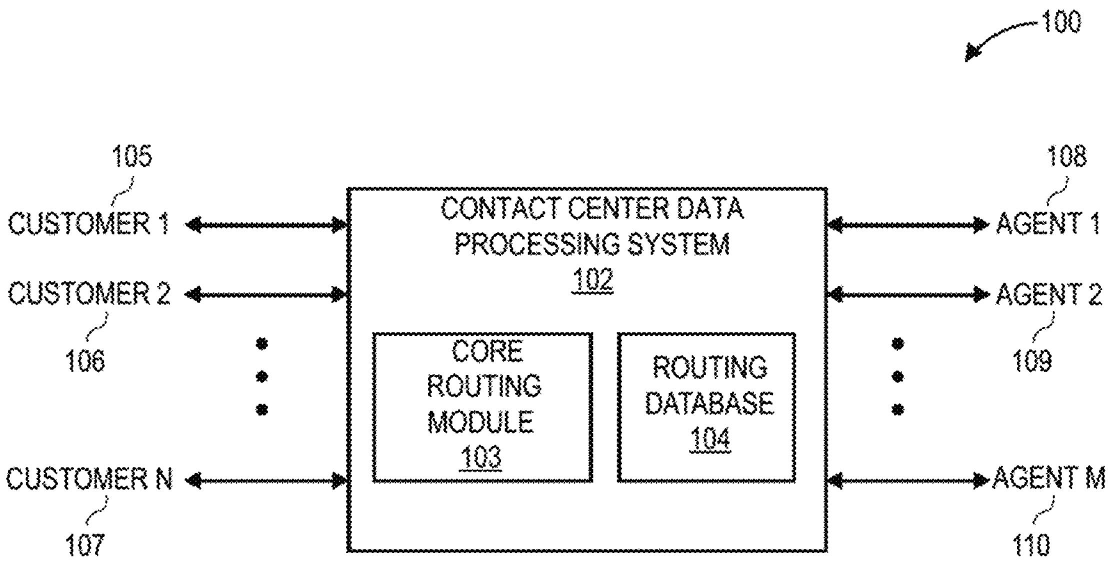
FIG. 1A illustrates one embodiment of a flexible and extensible contact center environment.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Data tracking and generation for workforce management are described. One of the goals, met in various embodiments disclosed herein, is to make tracking much less difficult than it is today. That is, the various embodiments described herein help companies access accurate, non-duplicated tracking of work. In a multi-channel world, where customers can be contacting a company using several channels at once, companies want to be sure they're not double-counting the work. Because typical contact tracking counts the handle time/work bursts for all channels at a given time, present embodiments remove the possibility of duplicate counting, while also giving an accurate view into the volume of work the contact center is managing.

In one embodiment, the data tracking and generation is associated with a contact center. In one embodiment, the contact center handles contacts using a customer-focused approach and the data related to the customer contacts is tracked and converted into data that can be used by a workforce management system. In one embodiment, the data tracking and generation is performed by the workforce management system. In another embodiment, the data tracking and generation is performed by a system separate from the workforce management system and is provided to the workforce management system. In one embodiment, the system that performs the data generation and tracking is part of the contact center (e.g., part of the contact center software and hardware, etc.). In response thereto, the workforce management system performs one or more of its well-known functions such as, for example, determining projected staffing levels for the contact center.

In one embodiment, the data tracking and generation system tracks customers and conversations between customers and agents. In this context, each contact, or conversation, item corresponds to the series of communications between a customer and agent that occurs during one communication session over one communication channel. A "conversation" as defined herein can be multiple contacts on multiple channels over a period of time, usually to resolve an issue. For example, processing a damaged shipment may take two phone calls and three emails, but would be considered one conversation, because all conversation, or contact, items were in support of resolving that one issue. For purposes herein, a communication channel can refer to any means of communication that can be used to provide service and communication between a company and a consumer or customer. In one embodiment, examples of communication channels include a short message service (SMS) message channel, text message channel, telephone contact channel, cell phone channel, email channel, social media channel, messenger channel, voicemail channel, phone callback channel, fax channel, or chat channel. Channels can include, but are not limited to, a video channel for one or more video calls, a video conferencing channel, a channel created by communication applications that include calling functionality such as, for example, FaceTime, WhatsApp, Skype, communication applications that operate such as, for example, Google Hangouts, real-time hologram, chat (e.g., web chat, mobile application chat, WeChat, Apple Business Chat, etc.), a channel created by a communications functionality including text, short message service (SMS), and Multimedia Messaging Service (MMS), email, voice mail, fax, radio, WhatsApp, Facebook Messenger, Twitter, Instagram, LinkedIn messaging, using a kiosk, and many other social media communication channels.

In one embodiment, the system tracks, tags and analyzes various aspects of the conversations (communications), which are of various types and occur over various channels.

In one embodiment, the tracking and analysis divides each conversation, or communication, into discrete time segments that are tagged and associated with a particular type of channel. In one embodiment, this information is stored in a database or other storage facility.

The data that is tracked and generated from the conversations between agents and customers is provided or made available to the workforce management system. The availability may be accomplished by providing access for the workforce management system to one or more databases storing the tracked and generated data. Based on the data tracked and generated, the workforce management system performs one or more of field service management, human resource management, performance and training management, data collection, recruiting, budgeting, forecasting, scheduling and analytics. In one embodiment, the workforce management system generates various reports. In one embodiment, for input to the one or more databases, the system provides a user interface. In one embodiment, access to the one or more databases is also provided to workforce management systems through the use of an application programming interface (API).

The description below is divided into two parts. The first part includes systems and methods are disclosed for flexible and extensible contact center routing, with the embodiments illustrated in FIGS. 1-14, while the second part includes systems and methods disclosed for data tracking and generation for a customer-focused workforce management, with embodiments illustrated in FIGS. 15-19. For one embodiment, with respect to the contact center routing incoming contacts are routed on any number of communication channels between customers and agents. Routing of contacts on these communications channels can be flexible such that a contact center can switch from one communication channel to a different communication channel. For example, a customer may have started a contact using SMS messaging, but now desires to speak with an agent directly. The techniques disclosed herein allow the contact center to switch over from one communication channel to a different communication channel—e.g., switching between a SMS communication channel to a telephone communication channel. By doing so, the techniques enable a seamless transition of communication for the customer-agent pair when switching communication channels. Accordingly, the disclosed flexible and extensible routing techniques improve on the rigidness of conventional contact centers to meet customer needs which can be continuously changing.

For purposes herein, agents, service representatives, advisors, or any other title, can refer to any user of the system that would use a tool to provide service to consumers or customers. These agents can be interfacing with the consumers or customers, or they can be completing work that does not require them to interface with consumers or customers. Agents can benefit from this routing system whether they access their work through a user interface of the system described herein, or whether they access their work in an external system that is connected to the system described herein through API or other means or remote access and control.

Administrators, or admins, can refer to any user of the system, whether accessing the tool through a user interface or API or other remote access and control method, who has sufficient levels of permission to monitor and edit the settings that extend and adjust the routing system.

As set forth herein, various embodiments, examples and aspects will be described with reference to details discussed below, and the accompanying drawings will illustrate various embodiments and examples. The following description and drawings are illustrative and are not to be construed as limiting. Numerous specific details are described to provide a thorough understanding of various embodiments and examples. However, in certain instances, well-known or conventional details are not described in order to provide a concise discussion of the disclosed embodiments and examples.

Flexible and Extensible Contact Center Routing Environment

FIG. 1A illustrates one embodiment of a flexible and extensible contact center environment 100. Contact center environment 100 includes a contact center data processing system 102 receiving incoming contacts from customers 1 to N (105-107) and routing the incoming contacts to agents 1 to M (108-110) for service. N and M can represent any number of customers and agents. For one embodiment, contact center data processing system 102 can include a computing architecture, as shown, e.g., in FIG. 8, having components to implement core routing module 103 and routing database 104. For one embodiment, core routing module 103 can be a combination of hardware and/or software to implement programs or program modules that perform one or more functions or operations including the disclosed flexible and extensible contact routing techniques. For one embodiment, database 104 can be any type of database including a relational database management system (RDMS).

For one embodiment, routing database 104 stores attributes for customers 1 to N, agents 1 to M, and Boolean representations used to determine or generate scores or priorities on how agents 1 to M are assigned to service customers 1 to M. For example, routing database 104 can store tables as shown, e.g., in FIGS. 2A-2F, describing attributes for customers and agents, guidelines, criteria, and Boolean representations used to determine and generate scoring pairs between agents and pair or determine priorities for servicing customers. The routing database 104 tables can be adjusted or programmed allowing for contact routing to be flexible and extensible for the changing needs of customers. For other embodiments, routing database 104 can store any number of guidelines, criteria or Boolean representations to further assist how to determine scoring pairs or set priorities for certain customers, which override a high pair score with respect to certain customers. For one embodiment, core routing module 103 can use one or more tables stored in database 104 and/or guidelines, criteria or Boolean representations to route incoming contacts from customer 1 to N to one of the agents 1 to M based on a pairing score or a priority. For example, each of the agents 1 to N can have a pairing score associated with each of the customers 1 to N, and the highest pairing score between an agent with the customers can be used to connect that agent related to a highest pairing score with a customer. For other embodiments, an override condition can exist to give priority to a particular customer regardless of a highest pairing score, e.g., a special status customer or customer in an emergency situation.

Figure 1B:
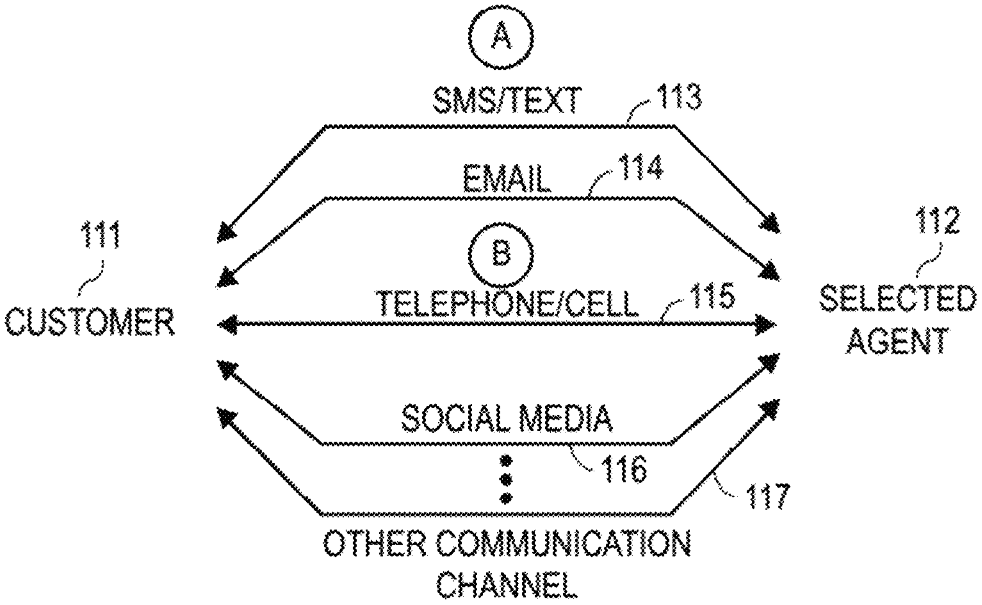
FIG. 1B illustrates one embodiment of communication channels for routing a customer to a selected agent in the contact center environment of FIG. 1A.

FIG. 1B illustrates one embodiment of communication channels 113 to 117 for routing a customer 111 to a selected agent 112 in the contact center environment 100 of FIG. 1A. For this example, communication channel 113 can represent a short message service (SMS) or text channel, communication channel 114 can represent an email channel, communication channel 115 can represent a telephone or cell channel, communication channel 116 can represent a social media channel, and communication channel 117 can represent other communication channels. For one embodiment, core routing module 103 can initially route customer 111 to selected agent 112 on a SMS/Text channel 113 represented by "A." During the service session with selected agent 112, the enhanced core routing module 103 can change the communication channel to telephone contact channel 115 represented by "B." For example, customer 111 may have started communicating with selected agent 112 on channel A in which details were cumbersome to type in on a keypad and texted selected agent 112 that he wanted to speak personally over the phone. In this case, when customer 111 contacts the contact center, core routing module 103 can be configured to know that selected agent 112 was engaged with session on a SMS/text communication channel 113 and route the contact on telephone/cell communication channel 115 directly to selected agent 112. In this way, customer service can be improved by allowing for seamless transition between communication channels at a contact center.

Agent and Customer Attributes and Scoring Pair Examples

FIG. 2A illustrates one embodiment of a routing database table 200 matching agents 201 to a customer 202 based on a highest scoring pair. Database table 200 can be stored in routing database 104. Referring to FIG. 2A, database table 200 includes a list of agents 201 identified as "1" through "5." Although five agents are listed, database table 200 can include any number of agents. For this example, each of the agents 1 through 5 is associated with a scoring pair 203 regarding customer "3"—i.e., scoring pairs of 14, 14, 12, 16 and 14 for agents 1 to 5, respectively. Based on the scoring pair, agent 4 has the highest scoring pair of "16" with respect to customer 3. As a result, in this example, core routing module 103 can route an incoming contact from customer 3 to agent 4 having the highest scoring pair 16 based on database table 200. Each scoring pair 203 can be based on customer 202 attributes, agent 201 attributes, guidelines, criteria or Boolean representations. For example, customer 3 may have an attribute of speaking Spanish, and agent 4 may also have an attribute of speaking Spanish and having serviced customer 3 previously which allows agent 4 to have the highest scoring pair. The attributes for agents 201 and customer 202, guidelines, criteria or Boolean representation can be adjustable and extensible, which can be used by core routing module 103 to update or modify routing of incoming contacts from customer 3 to any of the agents 1 through 5 as contact center circumstances change or evolve. In other examples, there will be any number of customers and a respective scoring pair for each of the agents, e.g., agents 1-5. For example, there may be customers 1-20 having a scoring pair with each of the agents 1-5. This would allow the contact center to optimize for the best possible pairings across a range of customers and agents.

FIG. 2B illustrates one embodiment of a routing database table 205 showing attributes 207-209 for agents 206. Referring to FIG. 2B, agents 206 are identified as 1 to 5 having names Salvatore, Gina, Terry, Jean-Michel, and Ling. The previously contacted customer 207 attributes refer to customers serviced previously by Salvatore, Gina, Terry, Jean-Michel and Ling. In this example of attributes, Salvatore, Terry and Ling had "None," while Gina previously contacted customer 3, and Jean-Michael previously contacted customers 3 and 5. For languages(s) 208 attributes, Terry, Jean-Michel and Ling speak English only, and Salvatore speaks Spanish only, and Gina speaks both English and Spanish. And, for expertise 209 attributes, Salvatore, Jean-Michel and Ling have expertise in Products and Gina and Terry have expertise in Billing. These attributes can be used to determine scoring pairs or priorities using any number of guidelines, criteria or Boolean representations. For example, for an incoming contact by customer 3 who speaks Spanish and needs expertise in Billing, based on the attributes for agents 206, Gina would have positive results because she previously serviced this customer, speaks Spanish and has expertise. Accordingly, for customer 3, Gina can have the highest pairing score among the other agents, which can be used by core routing module 103 to route an incoming contact from customer 3 to Gina.

FIG. 2C illustrates one embodiment of a routing database table 210 showing attributes 212-218 for customers 211. In this example, there are five customers (1 to 5) having names Ingrid, Maria, Jose, Jeanette and Antoine. Attributes associated with customers 1 to 5 are channel 213, minutes waiting 214, status 215, languages 216, snowstorm 217, and issue area 218. The channel 218 attributes show that text, SMS, email, phone and phone channels are used by customers 1 to 5 for an incoming contact to contact center environment 100. The minutes waiting 214 attribute shows waiting times of 0.5, 7, 10, 15 and 4 minutes for customers 1 to 5. The status 215 attributes show status of premium, none, none, basic and none for customers 1 to 5. The languages 216 attributes show English, Spanish, English and Spanish, Spanish and English for customers 1 to 5. Snowstorm 217 attributes show no, no, yes, no and no for customers 1 to 5. And the issue area 218 attributes show billing, billing, products, billing and unknown for customers 1 to 5.

For one embodiment, a guideline, criteria or Boolean representations can be used for any one or combination of attributes 213 to 218 to determine a pairing score. For example, a guideline, criteria or Boolean representation can be if the status 215 attribute for a customer is "Premium," then that customer (i.e., customer 1, Ingrid) should be routed first regardless of wait times of the other customers and thus provide a high score. In this example, Ingrid has the shortest wait time of 0.5 minutes while Jose has waited for 10 minutes. For this contact center, status of customer may give priority over non-premium customers to premium customers. Alternatively, a contact center can make long wait times as having higher priority over short wait times regardless of the status of customer. In other examples, if a customer is in an emergency situation, e.g., snowstorm 217 attribute is Yes (e.g., Jose is impacted by a snowstorm), that customer may be given a higher scoring pair or priority over other customers. Any number of guidelines, criteria or Boolean representations can be used using any number of customer attributes 213 to 218 to determine a scoring pair or to give priority to certain customers regardless of scoring pair.

FIG. 2D illustrates one embodiment of a routing database table 220 showing scoring pairs based on customer and agent attributes of FIGS. 2B-2C. For one embodiment, core routing module 103 can process the customer and agent attributes to determine matches along any number of guidelines, criteria or Boolean representations to calculate a scoring pair of 14 between Salvatore and Jose. In this example, agent Salvatore whose attributes 221 include Agent ID as 1, previously contacted customer ID(s) as None, Language(s) as Spanish, and Expertise as Products. In this example, the matched customer is Jose whose attributes 222 include Customer ID as 3, Channel as Email, Minutes waiting as 10, Status as None, Language(s) as English and Spanish, Snowstorm Impact as Yes and Extreme, and Issue area as Products.

For one embodiment, core routing module 103 can calculate or generate pairing scores for all customers 223 such that Ingrid, Maria, Jose, Jeannette and Antoine receive scores of 2, 3, 14, 7 and 1, respectively, with respect to Salvatore as the agent. These pairing scores can be based on any of the customer or agent attributes and any combination of guidelines, criteria or Boolean representations. For example, for the high score calculation 224 of 14 for Jose, the matched attributes for Salvatore as an agent and Jose as a customer included Snowstorm Impact with a sub-score of 10, Same Language with a sub-score of 2, and Subject Matter Expertise with a sub-score of 2 which totaled 14. For this contact center, Snowstorm Impact was given a high priority of 10. For example, the contact center could be for winter equipment products and, if snowstorm impact was observed, the contact center would give the customer impacted by a snow storm a higher priority and score because it has been also identified as "extreme." For one embodiment, the communication channel of email by Jose could be switched over to telephone or SMS text such that agent Salvatore can provide a more immediate response to meet the needs of the customer—i.e., Jose.

FIG. 2E illustrates one embodiment of a routing database table 225 showing a list of criteria and Boolean representations to match agents with customers. Referring to FIG. 2E, the criteria ID 226 include 1 to 7 referring to Names Previous Contact, Premium Status, Snowstorm Impact, Some Wait, Long Wait, Same Language and Subject Matter Expertise. The table 225 shows how the criteria are satisfied based on Boolean representations or operations and if certain attributes are indicated or present. For one embodiment, core routing module 103 can determine if each incoming contact from a customer meets the seven criteria and Boolean representations to determine scoring pairs for matching customers to an agent.

In this example, for the Previous Contact criteria (1) to be met, the agent's previous customer ID attributes include the same customer ID related to an incoming contact. The importance criteria can be indicated as Medium. If, for example, there is a tied pairing score for all customers, any type of tie-breaking mechanism can be used, such as the customer having the longest wait time, to match the customer to the agent. For Premium Status criteria (2) to be met, customer status equals Premium. The importance of this criteria can be indicated as Low. For Snowstorm Impact criteria (3) to be met, snowstorm impact indication for the customer equals Yes. The importance of this criteria can be indicated as Extreme. For the Some Wait criteria (4) to be met, customer wait time is greater or equal to 4 minutes AND customer wait time is less than 11 minutes. The importance of this criteria can be indicated as Low. For the Long Wait criteria (5) to be met, the customer wait time must be greater or equal to 11 minutes. The importance of this criteria can be indicated as High. The importance levels can assist in determining pairing scores or weighting scores.

For the Same Language criteria (6) to be met, the customer AND agent language equals English OR customer AND agent language equals Spanish. The importance of this criteria can be indicated as Medium. For the Subject Matter Expertise criteria (7) to be met, the customer issue area AND agent area of expertise equals Billing or customer issue area AND agent area of expertise equals Products OR customer issue area AND agent area of expertise equals Tech/Website. In the above examples, the number of criteria is extensible in which additional criteria can be added. The attributes and Boolean representations can also be adjusted, modified or extended. For one embodiment, if importance to routing is Extreme, the weighting or scoring can be increased. In this example, if a customer had Previous Contact, Premium Status, Long Wait, Same Language, and Subject Matter Expertise points, the customer could be matched or paired with an agent ahead of another customer who only has the Snowstorm Impact, but no other points. In other examples, an override condition can be determined on specific Boolean conditions that can place certain customers and agents ahead of a main group.

FIG. 2F illustrates one embodiment of a routing database table 240 showing a scenario of evaluating an agent and customer pair 241 according to the criteria of FIG. 2E. For this example, the pair to evaluate 241 includes agent 1 and customer 3 based on attributes and criteria of FIGS. 2B-2E. Referring to FIG. 2F, for the seven criteria of FIG. 2E, in criteria T/F field 243, criteria 3 (Snowstorm Impact), 6 (Same Language) and 7 (Subject Matter Expertise) were met and identified as TRUE. The other criteria were not met and identified as FALSE. The score for criteria 3 is 10 and criteria 6 and 7 the score was 2 such that the total score for the agent-customer pair is 14. For this pair, the agent Salvatore received a total score of 14 with customer 3. In the temporary data store 242, attributes for the agent (Salvatore) include previously contacted customer ID (None), Language (Spanish) and Expertise (Products). And attributes for the customer (Jose) include channel (Email), minutes waiting (10 minutes), Status (None) Language(s) (English and Spanish), Snowstorm Impact (Yes) and Issue Area (Products). Table 240 can be stored in routing database 104 in which scenarios for all the agents and customers can be saved for data analysis. As can be seen from the above examples, the customer attributes, agent attributes, guidelines, criteria and Boolean expressions and parameters are flexible such that they can be adjusted and extensible.

Exemplary Contact Center Routing Ecosystem

Figure 3A:
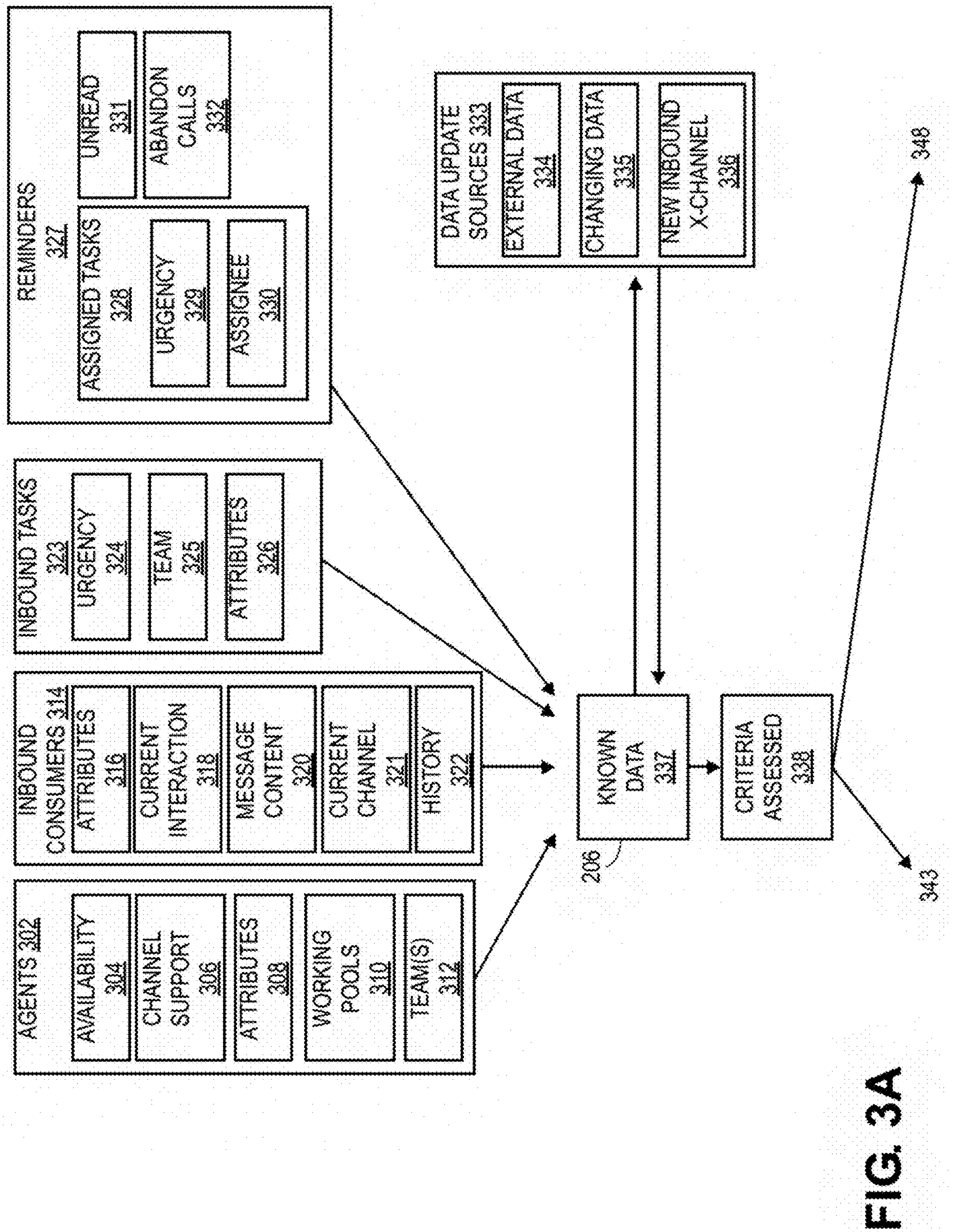
FIGS. 3A-3C illustrates one embodiment of a contact center routing ecosystem and data flow.
Figure 3B:
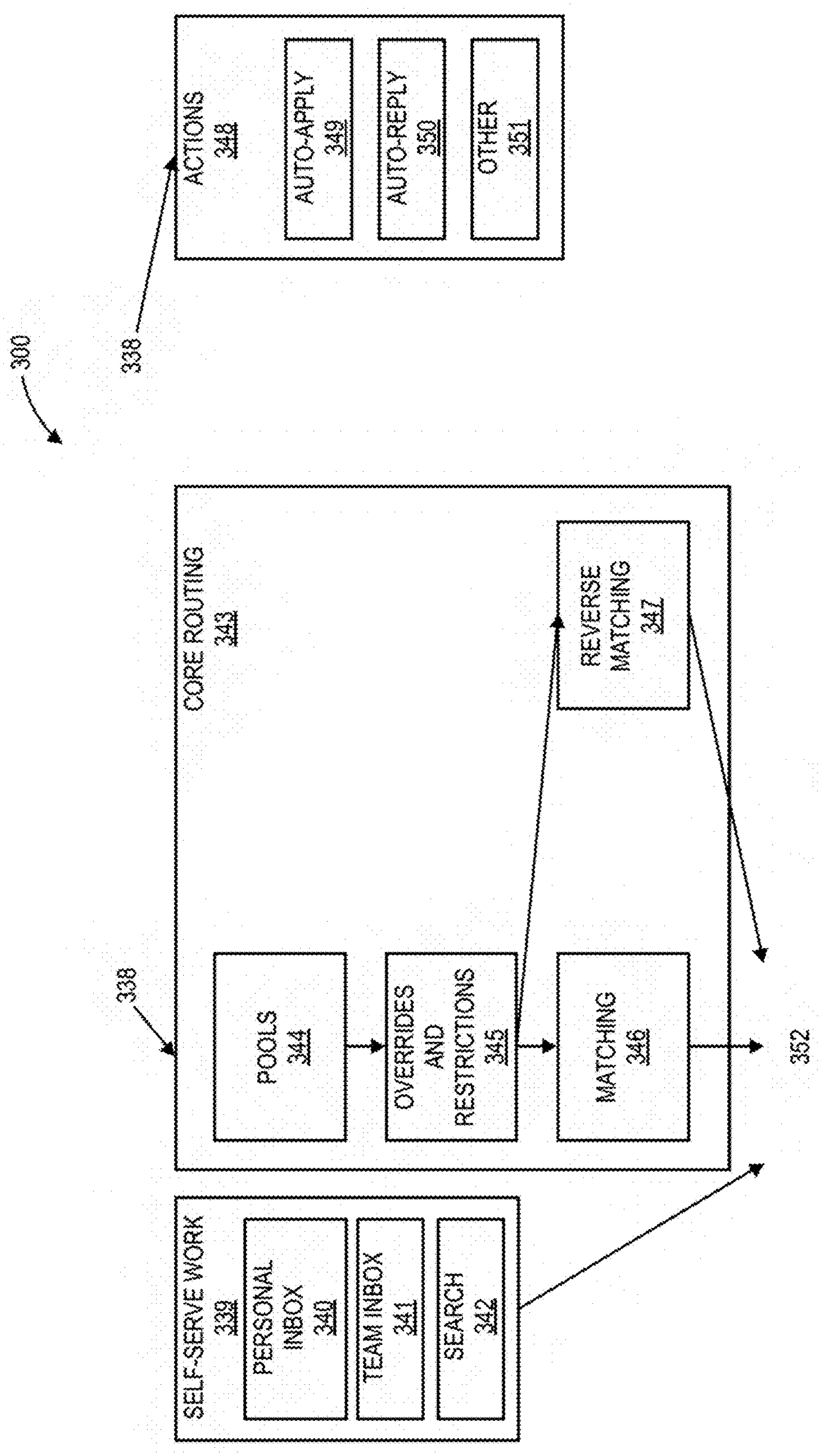
Figure 3C:
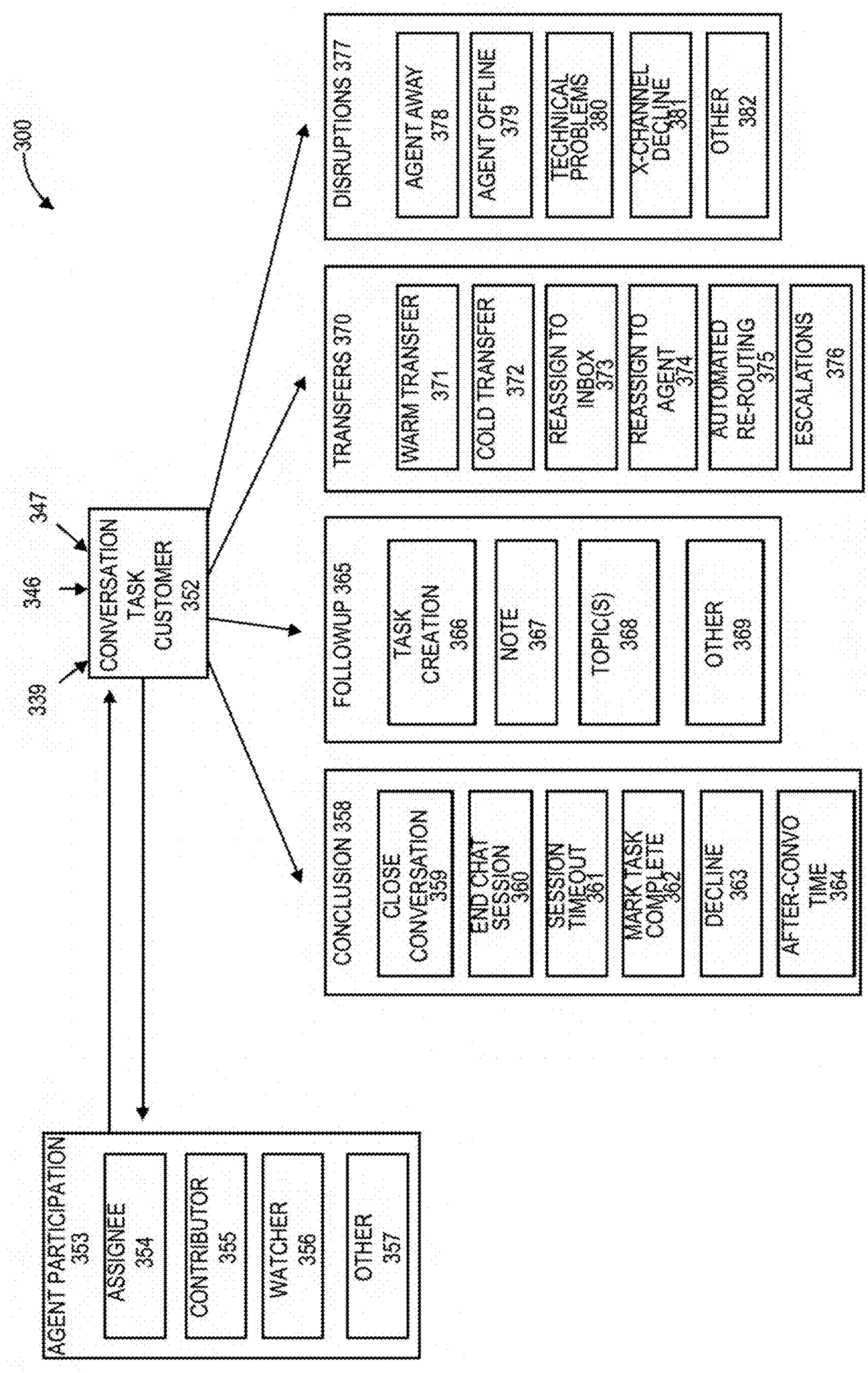

FIGS. 3A-3C illustrates embodiments of a contact center routing ecosystem 300 and data flow. Referring to FIG. 3A, data is collected (identified as known data 337) at a contact center and external to a contact center, which can be stored in a routing database, e.g., routing database 104, used for routing incoming contacts and task work. For example, the ecosystem 300 can take both inbound communications or contacts and route other types of work, e.g., such as calling a customer back or following up with an internal team to help or assist a customer issue. For one embodiment, multiple data sources within a contact center ecosystem 300 can supply information to known data 337 such as agents 302, inbound customers 314, inbound tasks 323 and reminders 327. These are just examples of data sources and other data sources can be used to supply information for known data 337 used for contact routing.

For one embodiment, agents 302 can supply multiple types of information including information related to availability 304, channel support 306, attributes 308, working pools 310 and teams(s) 312. For example, information related to availability 304 can indicate which agents are available or have capacity to service incoming communications. Information related to channel support 306 can indicate which channels agents are working on, e.g., email, telephone, SMS/Text channels, etc. Information related to attributes 308 can indicate attributes such as languages (e.g., Spanish), area of expertise (e.g., Products) and etc. related to agents 302. Information related to working pools 310 can indicate pools in which agents 302 work in such as different departments within an enterprise or company. Information related to team(s) 313 can indicate which agents 302 work on which teams, e.g., Western Regional Team, Operations Team, etc.

For one embodiment, inbound customers 314 can supply multiple types of information to known data 337 including information related to attributes 316, current interaction 318, message content 320, current channel 321 and history 322. For example, information related to attributes can indicate attributes of customers 314 such as language (e.g., Spanish), premium customer and etc. Information related to current interaction 318 can include a current interaction with the contact center, e.g., related to Billing, how long the customer has been waiting and etc. Information related to message content 320 can include what language the communication is in, whether the content has a negative sentiment or etc. Information related to current channel 321 can indicate which channel the customer is being serviced on, e.g., SMS channel, and what channels are available to service the customer. Information related to history 322 can include how many times a customer has contacted the enterprise or company recently, and how satisfied they were with previous interactions, and etc.

For one embodiment, inbound tasks 323 can supply multiple types of information to known data 337 including information related to urgency 324, team 325 and attributes 326. Information related to urgency can place a priority on an inbound task related to customers 314 and agents 302. Information related to team 325 can indicate the agents in a team who should service the inbound tasks 323. Information related to attributes 326 can include what type of task needs to be completed, e.g., Redress fraudulent transaction.

For one embodiment, reminders 327 can supply multiple types of information to known data 337 including information related to assigned tasks 328, which includes information related to urgency 329 and assignee 330, and information related to unread reminders 331 and abandoned contacts 332. Information related to assigned tasks 328 can indicate if a task is urgent or non-urgent or have other priorities using information related to urgency 329 and information related to assignee can indicate which agent or agents is assigned to a task. Information related to unread 331 indicates if an inbound message has been read or reviewed by any of agents 302. Information related to abandoned contacts 332 can indicate which contacts were abandoned and a reason for a contact being abandoned, e.g., customer dropped contact, so that agents can determine how to best reengage with customers, etc.

For one embodiment, known data 337 is coupled to data update sources 333. Known data can update data from data update sources 333 or store some or all of the information in known data 337 as a cache. For other embodiments, data update sources 333 can supply multiple types of information to known data 337 including information related to external data 334, changing data 335 and new inbound x-channel 336 (cross-channel) used for modifying or updating information in known data 337. Information related to external data 334 can include updating customer attributes 316 from an external data source, e.g., refreshing the customer's latest banking transaction history. Information related to changing data 335 can be any type of data that is changing as the interaction unfolds, e.g., the time that a customer is waiting 318 or the channels 306 that an agent is available to service. Information related to new inbound x-channel 336 can indicate if customer or agent initiates additional communication over a new channel, e.g., when an inbound customer 314 reaches out by phone to start and then also reaches out on social media channels.

For one embodiment, core routing module 103 can implement criteria assessed 338 using known data 337 to route contacts at a contact center. Criteria assessed 338 can include Boolean representations or statements using attributes 308 for agents 302 and attributes 317 for inbound customers 314 or other information and guidelines from known data 337. Criteria assessed 338 can also determine scores for matching agents 302 to inbound customers 314. For other embodiments, criteria assessed 338 can provide guidelines to choose pools of agents 302 to service inbound customers 314, provide overrides or restrictions while matching agents 302 to customers 314, provide auto-reply rules, apply topics to the interaction, or trigger other rules for any issue matching agents 302 to inbound customers 314. Outputs and information from criteria assessed 338 are forwarded to core routing 343 and parallel actions 348 as shown in FIG. 3B.

FIG. 3B is a continuation of the contact center ecosystem 300 shown in FIG. 3A. Referring to FIG. 3B, core routing 343 receives or uses information from criteria assessed 338, which includes functions related to pool 344, overrides and restrictions 345, matching 346 and reverse matching 347. Functions related to pool 344 perform tasks in distinct parts at a contact center or distinct parts of an organization such as region, brands, product types etc. Functions related to overrides and restrictions 345 can override matches between customers to a particular available agent or place restrictions on agents to which types of customers to service. For one embodiment, overrides and restrictions 345 can be prioritized for a small pool of customers, e.g., Premium. For one embodiment, overrides and restrictions 345 can limit the pool of customers who an available agent can match with, e.g., negative comments regarding the available agent, by one or more customers in the pool.

For one embodiment, functions related to matching 346 can implement a first-to-respond approach. For example, when an agent becomes available, matching 346 can assess possible matches based on attributes, Boolean representations, scores, criteria, guidelines, rules and priorities using techniques disclosed herein in order to match a customer with the best available agent. Reverse matching 347 can perform functions in the case when there are more agents than incoming tasks or contacts (e.g., conversations, tasks etc.). For example, when a customer contacts the contact center, reverse matching 347 can assess each possible agent match and pair the customer with the best agent.

For one embodiment, actions 348 can be performed at a contact center that receives information from criteria assessed 338 shown in FIG. 3A. In one embodiment, actions 348 can include functions such as auto-apply 349, auto-reply 350 or other 351. Auto-apply 349 can apply topics to the interaction for reporting purposes. Auto-reply 350 can provide auto-reply messages if there are no available agents via the communication channel used by the customer, e.g., email, SMS/text messaging, chat etc. Other functions 351 can include future actions that would be triggered from criteria assessed 338.

For one embodiment, self-serve work 339 can be performed along with core routing 343 and parallel actions 348. Self-serve work 339 can be implemented by agents directed to functions related to personal inbox 340, team inbox 341 and search 342. For example, customer contacts may be directed to a personal inbox 340 of an agent or a team inbox 341 in which messages can be addressed and communicated within personal inbox 340 and team inbox 341. An agent can also implement a search 342 such as searching data on a particular customer or recent messages from a customer etc. Conversation task customer 352, as shown in FIG. 3C, receive inputs from core routing 343 and self-serve work 393.

FIG. 3C is a continuation of the contact center ecosystem 300 shown in FIGS. 3A-3B. Referring to FIG. 3C, conversation-task-customer 352 operation assigns or pairs customers or tasks to agents. For example, a conversation for an incoming customer is assigned to an agent based on operations from core routing 342 and/or self-serve work 339. Agent participation 353 interacts with conversation task customer 352 which includes assignee 354, contributor 355, watcher 356 and other functions 357 during the conversation with a customer. Regarding the conversation with a customer, conversation task customer 352 can then lead to operations such as conclusion 358 operations, follow-up 365 operations, transfer 370 operations, and disruptions 377 operations.

For one embodiment, conclusion operations 358 includes functions such as close conversation 359, end chat session 360, session timeout 361, mark task complete 362, decline 363 and after-conversation time 364. Other functions can be implemented and the above examples are not limiting. For one embodiment, follow-up operation 365 includes functions such as task creation 366, note 367, topic(s) 368, and other 369, which can be implemented by an agent for follow-up actions. For one embodiment, transfers 370 operations include functions such as warm transfer 371, cold transfer 372, reassign to inbox 373, reassign agent 374, automated re-routing 375 and escalations 376, which can be implemented by one or more agents or system functions. For one embodiment, disruptions 377 operations include functions to provide indications to a customer such as agent away 378, agent offline 379, technical problems 380, cross channel (x-channel) or communication channel decline 381 or other 382.

Exemplary Agent Interfaces

Figure 4A:
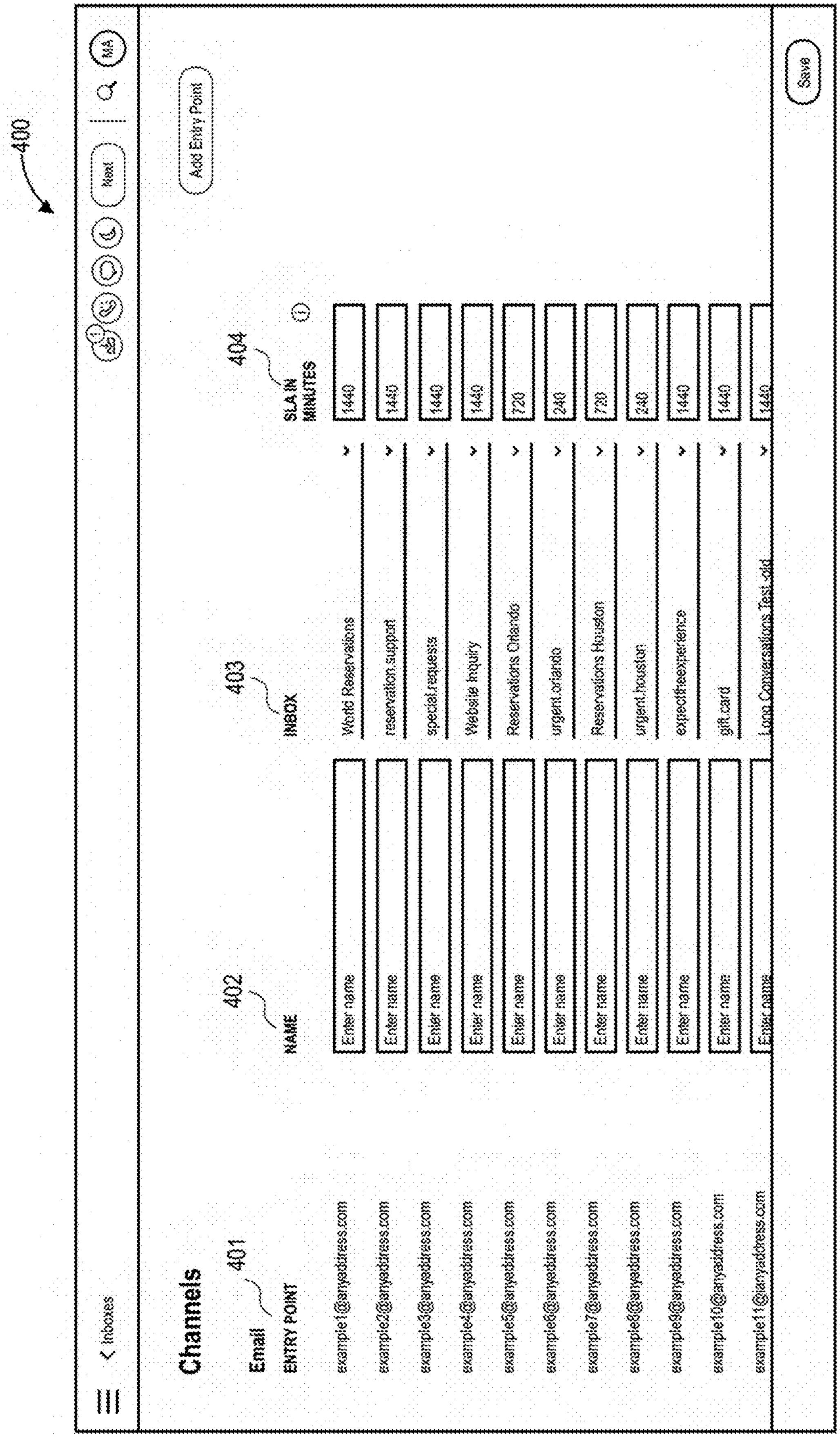
FIGS. 4A-4B illustrates one embodiment of screen shots of an administration interfaces for setting up communications with customers on multiple communication channels.
Figure 4B:
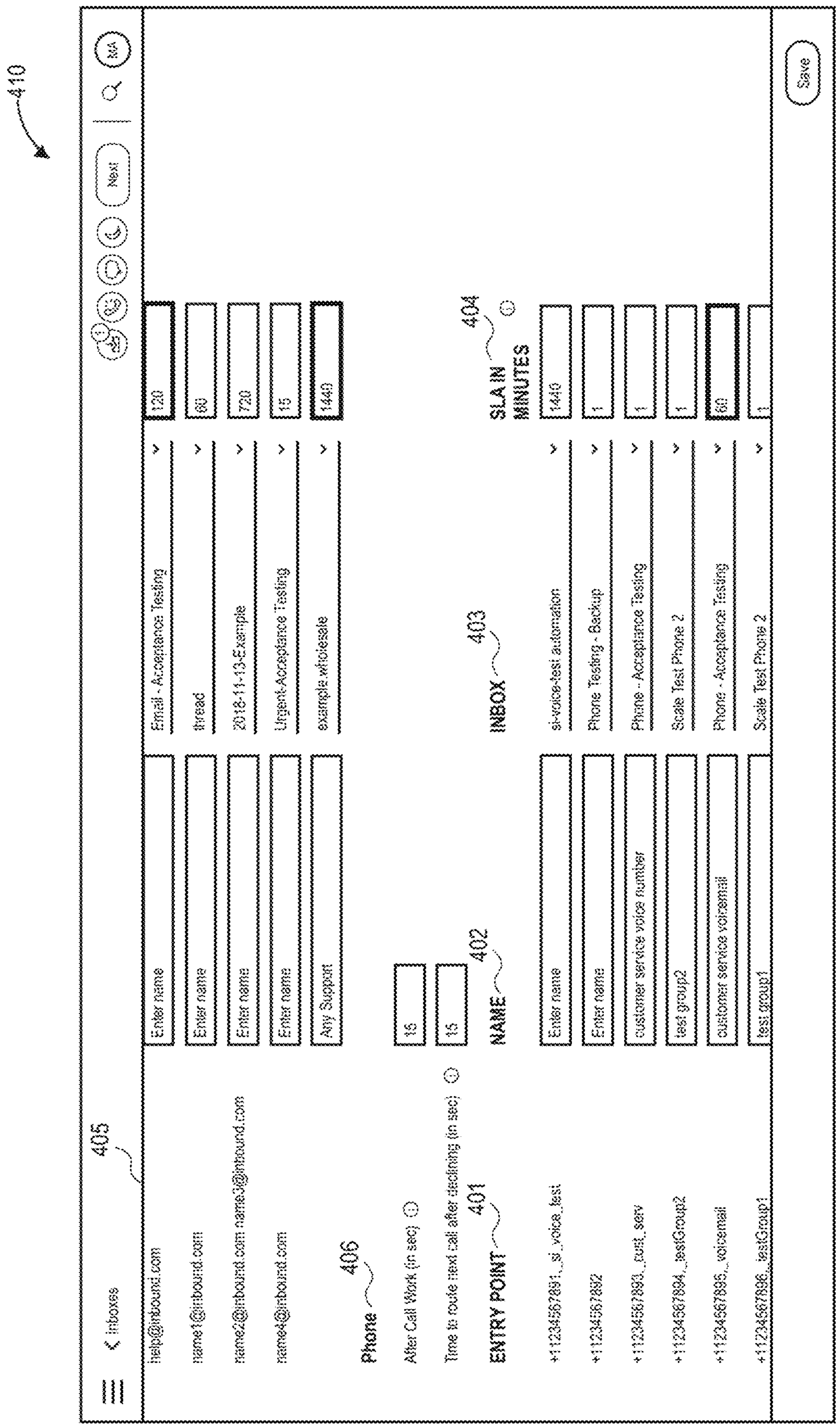

FIGS. 4A-4B illustrates one embodiment of screen shots 400 and 410 of administration interfaces for setting up communications with customers on multiple communication channels. Referring to FIG. 4A, for one embodiment, screen shot 400 shows an interface for an administrator for contacts that may be provided by the company to enable incoming communication via an email channel. More specifically, these emails are email addresses that the company owns and publishes on their website for people to contact them. For instance, a company might have an email help@dogs.com, veterinarians@dogs.com, billing@dogs.com, etc. The company would put those email addresses here, and connect them to Pools as described above (see FIG. 3B) and as Mapping Rules in FIG. 11. Communications received via these email addresses can be routed to an agent, a pool of agents, or a team of agents.

For one embodiment, screen shot 400 shows a list of email entry points 401 to a contact center. For example, the first entry indicates an email to World Reservations at a contact center. A name field 402 is provided in the interface for an administrator to enter a name for the entry point email. The inbox 403 indicates an email for a group of agents working on the World Reservations Inbox and a field 404 an SLA (service level agreement) response time to service the email and for the first entry an SLA response time is 1440 minutes.

Referring to FIG. 4B, the screen shot 410 is a continuation of screen shot 400. For example, the top part of screen shot 410 continues with email entry points with a name field, in box and SLA response time in minutes. Screen shot 410 also shows another communication channel for phone 406 that identifies the phone numbers at entry point 401 that customers dial to connect with the contact center. When the contact center is in use, the inbox 403 includes a contact to si-voice-test automation having an SLA wait time 1440 minutes. In this situation, an agent may override all other contacts and may end up using a contact specified here because of the long wait time. Alternatively, routing 104 routing may ignore long wait times if the customer from the incoming contact at entry point+11234567891 is a Premium customer and the contact center services Premium customers with the highest priority.

Exemplary Interfaces for Adjusting Rules and Criteria for Contact Routing

Figure 5:
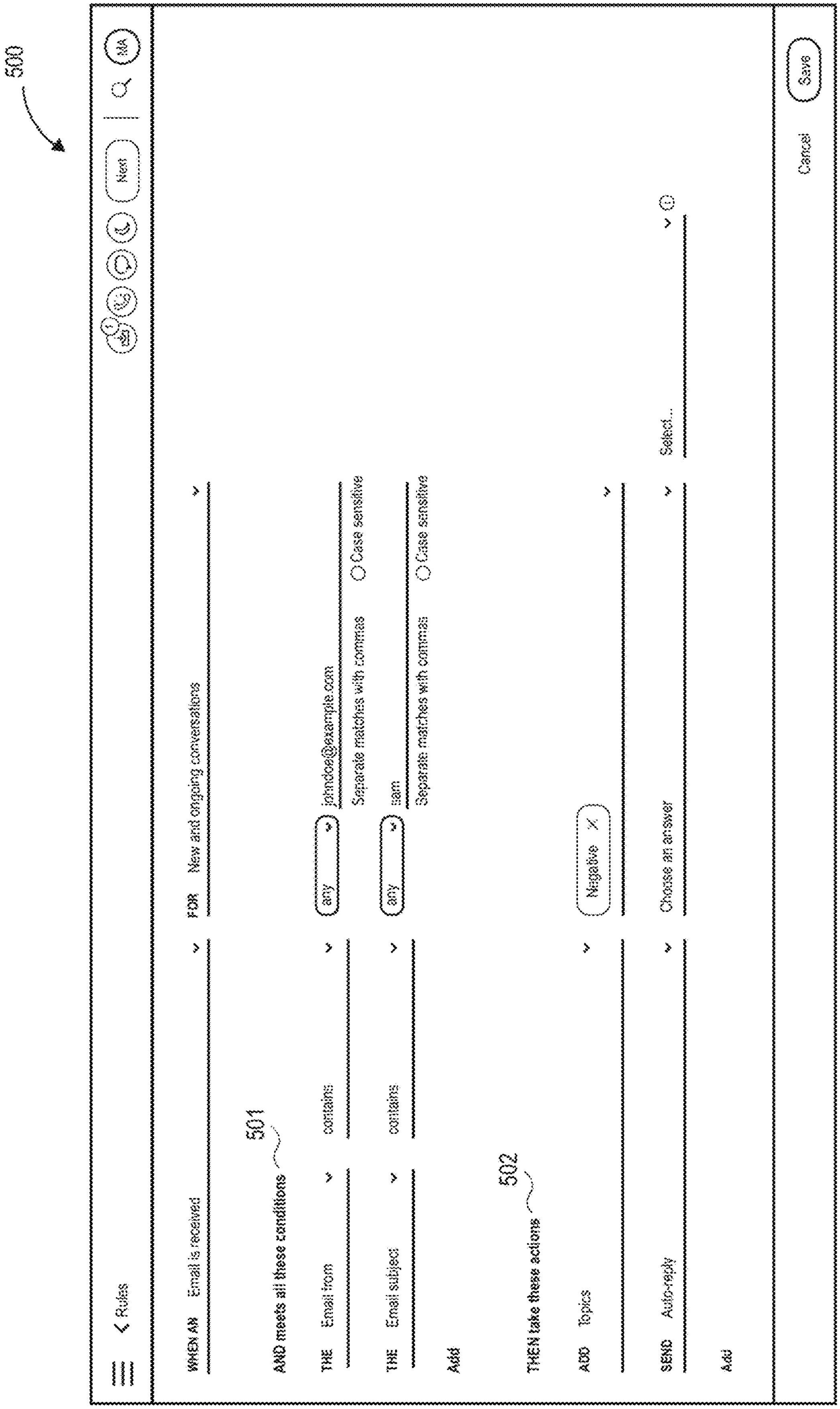
FIG. 5 illustrates one embodiment of a screen shot of exemplary rules or criteria for matching customers to agents.

FIG. 5 illustrates one embodiment of a screen shot 500 of rules or criteria for matching customers to agents. For this example, an interface allows a Boolean representation to be created, modified or adjusted and allows the rules or criteria to be extensible. The example Boolean representation 501 is shown as, e.g., for a rule or criteria when an Email is received for a new an ongoing conversation AND meets all the conditions of:

Email is from johndoe@anyemail.com

AND

Email subject contains Sam.

For this interface an "Add" function is provided such that a user or agent or administrator can add new rules. The Boolean representation can also be modified or adjusted. In this example, if the rule or criteria is met, then there are options for the actions that should be taken 502. For example, Topics can be added, was conversation negative, send Auto-reply, choose an answer or select other options.

Figure 6:
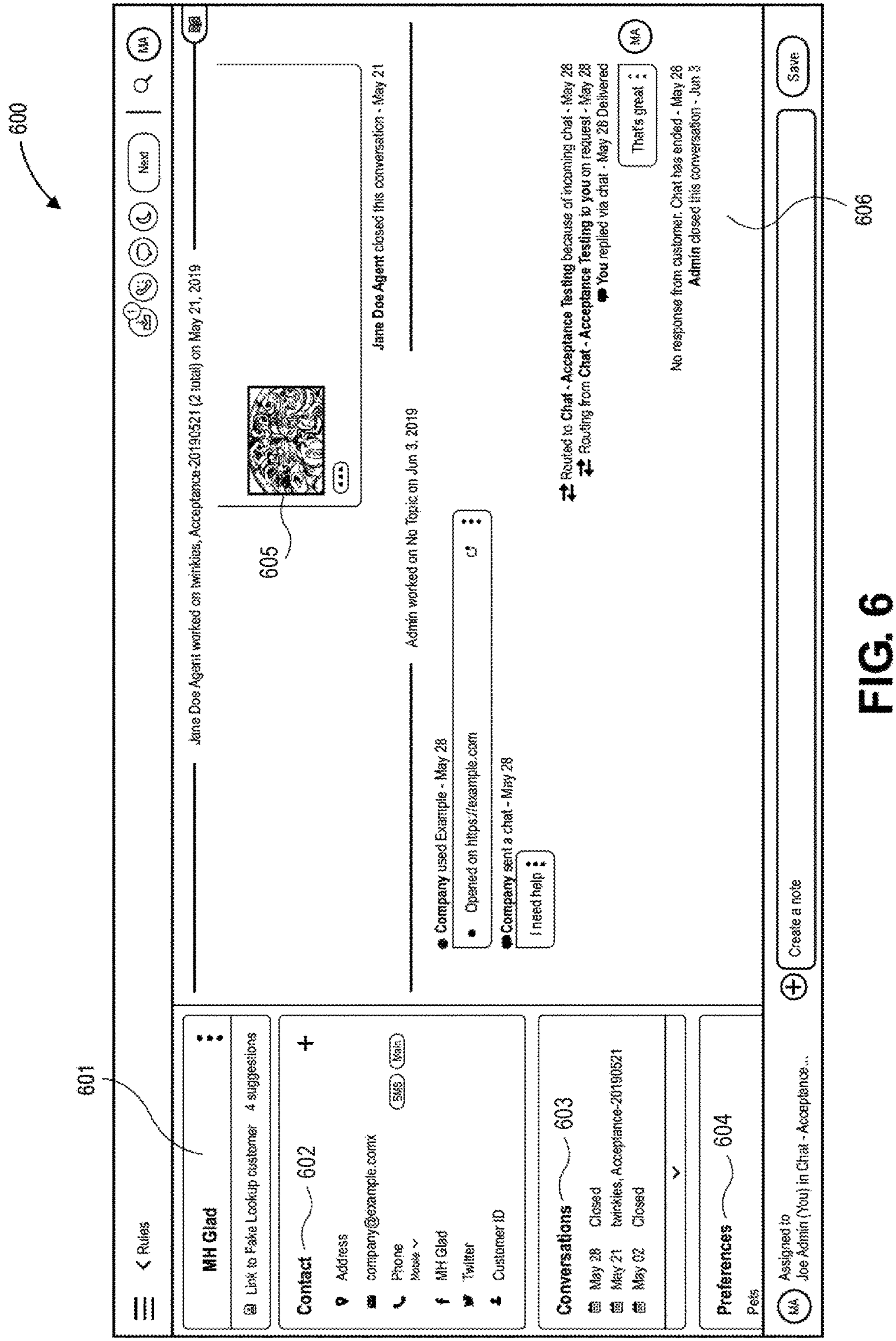
FIG. 6 illustrates another embodiment of a screen shot of an agent interface for helping customers after a rule or criteria match.

FIG. 6 illustrates another embodiment of a screen shot 600 of an interface after a rules or criteria match. This interface is for agent Jane Doe to help customer Company. Once a rule or criteria has been met, e.g., as shown in FIG. 5, the interface as shown in FIG. 6 can be provided to an agent. For example, the agent matched is identified as Jane Doe. For this customer, in the conversations window 603, there have been previous conversations on May 2, 21 and 28 with the agent Jane Doe. Windows 605 and 606 shows the previous conversations with Jane Doe with the customer.

Data Processing System or Computing System Architecture

Figure 7:
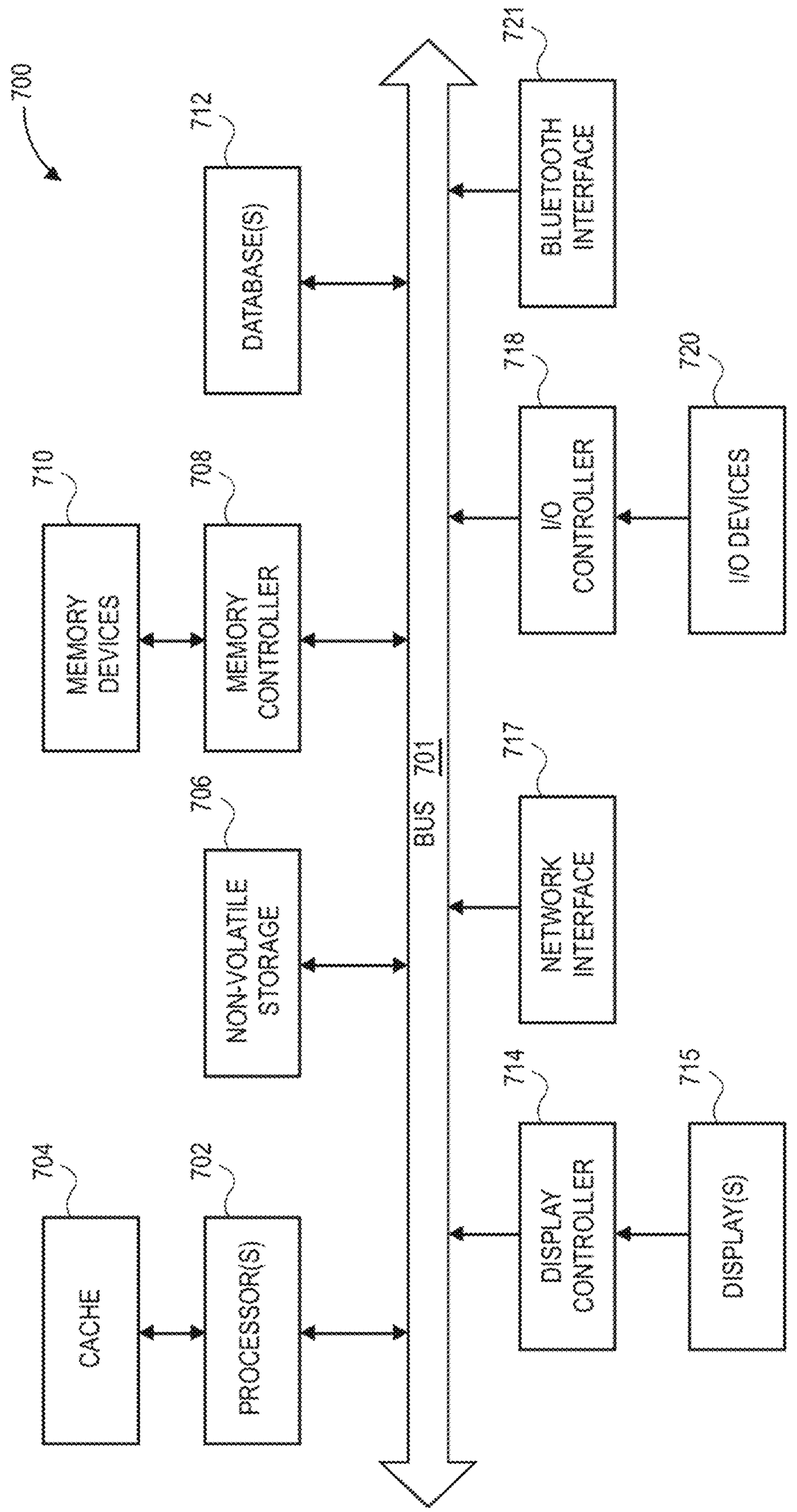
FIG. 7 illustrates one embodiment of a block diagram of data processing system or computing system architecture to implement the enhanced contact routing between customers and agents.

FIG. 7 illustrates one embodiment of a block diagram of a data processing system or computing system architecture 700 to implement the flexible and extensible contact routing techniques disclosed herein. The data processing system 700 can represent the various components for contact center data processing system 102 disclosed in FIG. 1A. Although FIG. 7 illustrates various components of a data processing system, the components are not intended to represent any particular architecture or manner of interconnecting the components, as such details are not germane to the disclosed examples or embodiments. Network computers and other data processing systems or other consumer electronic devices, which have fewer components or perhaps more components, may also be used with the disclosed examples and embodiments.

Referring to FIG. 7, data processing system 700, which is a form of a computing system, includes a bus 701, which is coupled to processor(s) 702 coupled to cache 704, display controller 714 coupled to a display 715, network interface 717, non-volatile storage 706, memory controller 708 coupled to memory 710, I/O controller 718 coupled to I/O devices 720, and database 712. Processor(s) 702 can include one or more central processing units (CPUs), graphical processing units (GPUs), a specialized processor or any combination thereof. Processor(s) 702 can retrieve instructions from any of the memories including non-volatile storage 706, memory 710, or database 712, and execute the instructions to perform operations described in FIGS. 1A-6.

Database 712 can also represent a routing database 104 and processor(s) 802 can implement core routing module 103 shown in FIG. 1A.

Examples of I/O devices 720 include mice, keyboards, printers and other like devices controlled by I/O controller 718. Network interface 717 can include modems, wired and wireless transceivers and communicate using any type of networking protocol including wired or wireless WAN and LAN protocols including LTE and Bluetooth interface and an API interface to communicate with Bluetooth devices. Data processing system 700 can also include a Bluetooth interface 721 that provide Bluetooth communication with Bluetooth devices. Memory 710 can be any type of memory including random access memory (RAM), dynamic random-access memory (DRAM), which requires power continually in order to refresh or maintain the data in the memory. Non-volatile storage 706 can be a mass storage device including a magnetic hard drive or a magnetic optical drive or an optical drive or a digital video disc (DVD) RAM or a flash memory or other types of memory systems, which maintain data (e.g. large amounts of data) even after power is removed from the system.

For one example, memory devices 710 or database 712 can store customer attributes, agent attributes and Boolean representations for flexible and extensible contact routing. Although memory devices 710 and database 712 are shown coupled to system bus 701, processor(s) 702 can be coupled to any number of external memory devices or databases locally or remotely by way of network interface 717 or Bluetooth interface 721, e.g., database 712 can be secured storage in a cloud environment.

Embodiments and examples disclosed herein can be embodied in a data processing system architecture, data processing system or computing system, or a computer-readable medium or computer program product. Aspects, features, and details of the disclosed examples and embodiments can take the hardware or software or a combination of both, which can be referred to as a system or engine. The disclosed examples and embodiments can also be embodied in the form of a computer program product including one or more computer readable mediums having computer readable code which can be executed by one or more processors (e.g., processor(s) 702) to implement the techniques and operations disclosed herein for a flexible and extensible contact center routing.

Exemplary Contact Center Routing Operations

Figure 8:
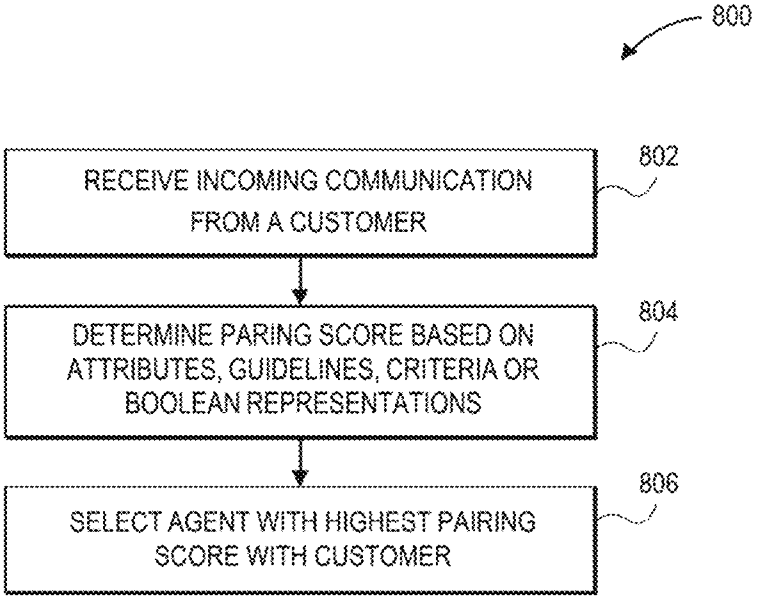
FIG. 8 illustrates one embodiment of a flow diagram of an operation for routing contacts at a contact center.
Figure 9:
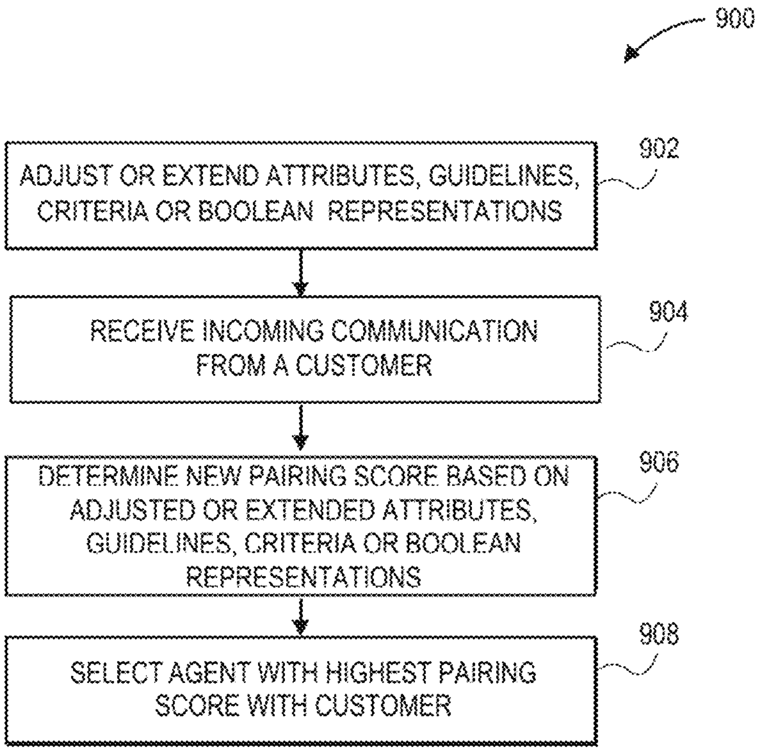
FIG. 9 illustrates another embodiment of a flow diagram of an operation for routing contacts at a contact center.
Figure 10:
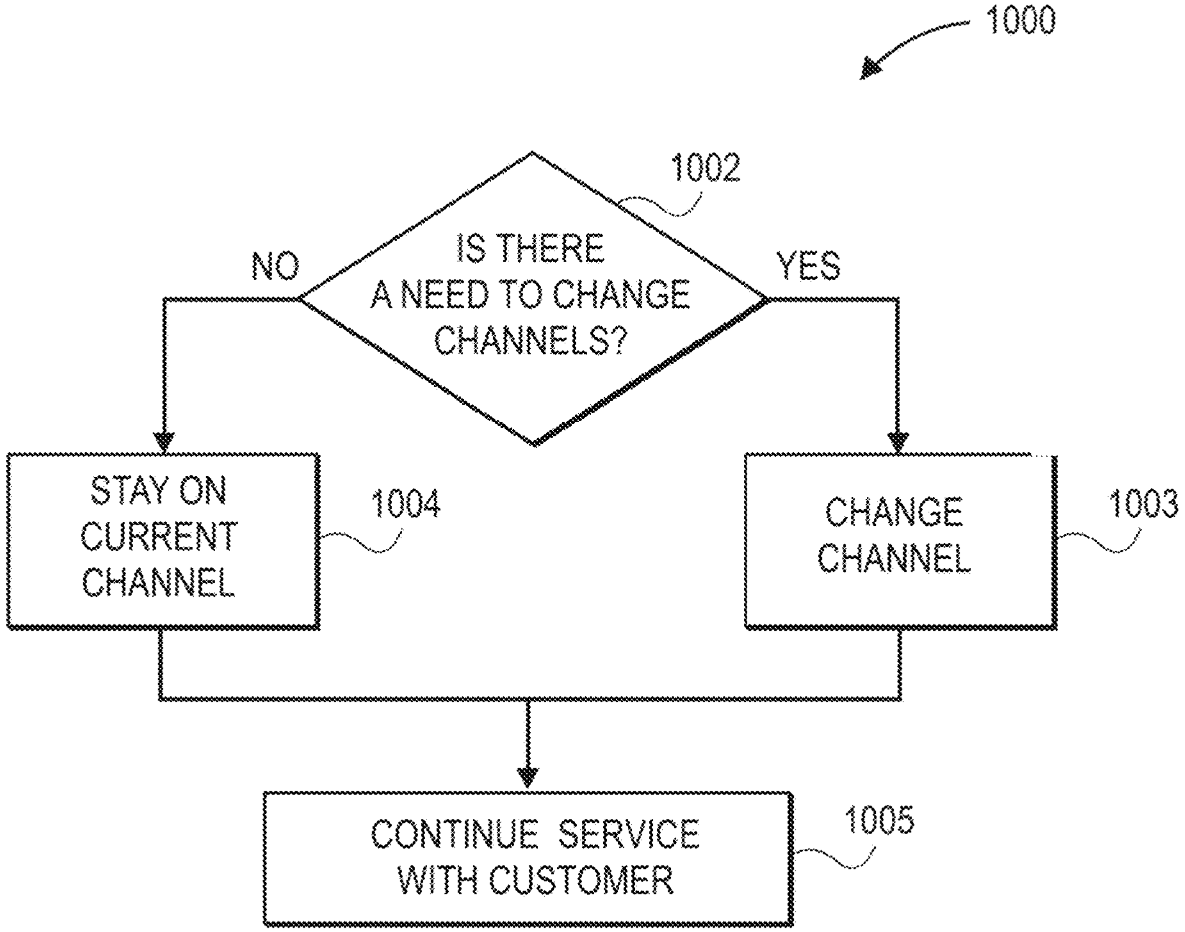
FIG. 10 illustrates one embodiment of a flow diagram of an operation for changing communication channels.

FIGS. 8-10 illustrate exemplary embodiments of operations 800, 900 and 1000 for routing incoming communications or contacts at a contact center. The following operations can be implemented by the contact center data processing system 102 of FIG. 1A in the contact center ecosystem 300 of FIGS. 3A-3C. Operations 800, 900 and 1000 can be implemented according to the contact routing techniques described in FIGS. 1A-7.

FIG. 8, illustrates one embodiment of a flow diagram of operation 800 for routing work or inbound communications or tasks at a contact center. Operation 800 includes operation blocks 802 to 806.

At operation block 802, an incoming communication is received at a contact center from a customer.

At operation block 804, a pairing score is determined based on attributes, guidelines, criteria or Boolean representations.

At operation block 806, an agent is selected with the highest pairing score with the customer. After selection of the agent, the contact center routes the incoming communication or the work to the selected agent.

FIG. 9 illustrates another embodiment of a flow diagram of operation 900 for routing work or incoming communications or tasks at a contact center. Operation 900 includes operation blocks 902 to 908.

At operation block 902, attributes, guidelines, criteria or Boolean representations are adjusted or extended.

At operation block 904, an incoming communication is received at a contact center from a customer.

At operation block 906, a pairing score is determined based on adjusted or extended attributes, guidelines, criteria, or Boolean representations.

At operation block 908, an agent is selected with the highest pairing score with the customer. After selection of the agent, the contact center routes the incoming communication or the work to the selected agent.

For the above example operations 800 and 900, routing can occur only when a new communication is initiated from a customer, and need not occur for each communication sent by a customer. For example, if a customer sends a SMS communication, the session can be routed to an agent using the disclosed routing techniques. If the customer sends successive SMS communications, the communication can go directly to the same agent servicing the customer without having to go through the above routing process.

FIG. 10 illustrates one embodiment of a flow diagram of operation 1000 for changing communication channels at a contact center. Operation 1000 includes operation blocks 1002 to 1005.

At operation block 1002, a determination is made if there is a need to change communication channels.

At operation block 1003, if the determination is Y, the current communication channel is changed to another communication channel and continues to block 1005 to continue service with a customer.

At operation 1004, if the determination is N, there is no change and the agent stays on the current communication channel and continues to block 1005 to continue service with a customer.

Additional Routing Interface Examples

Figure 11:
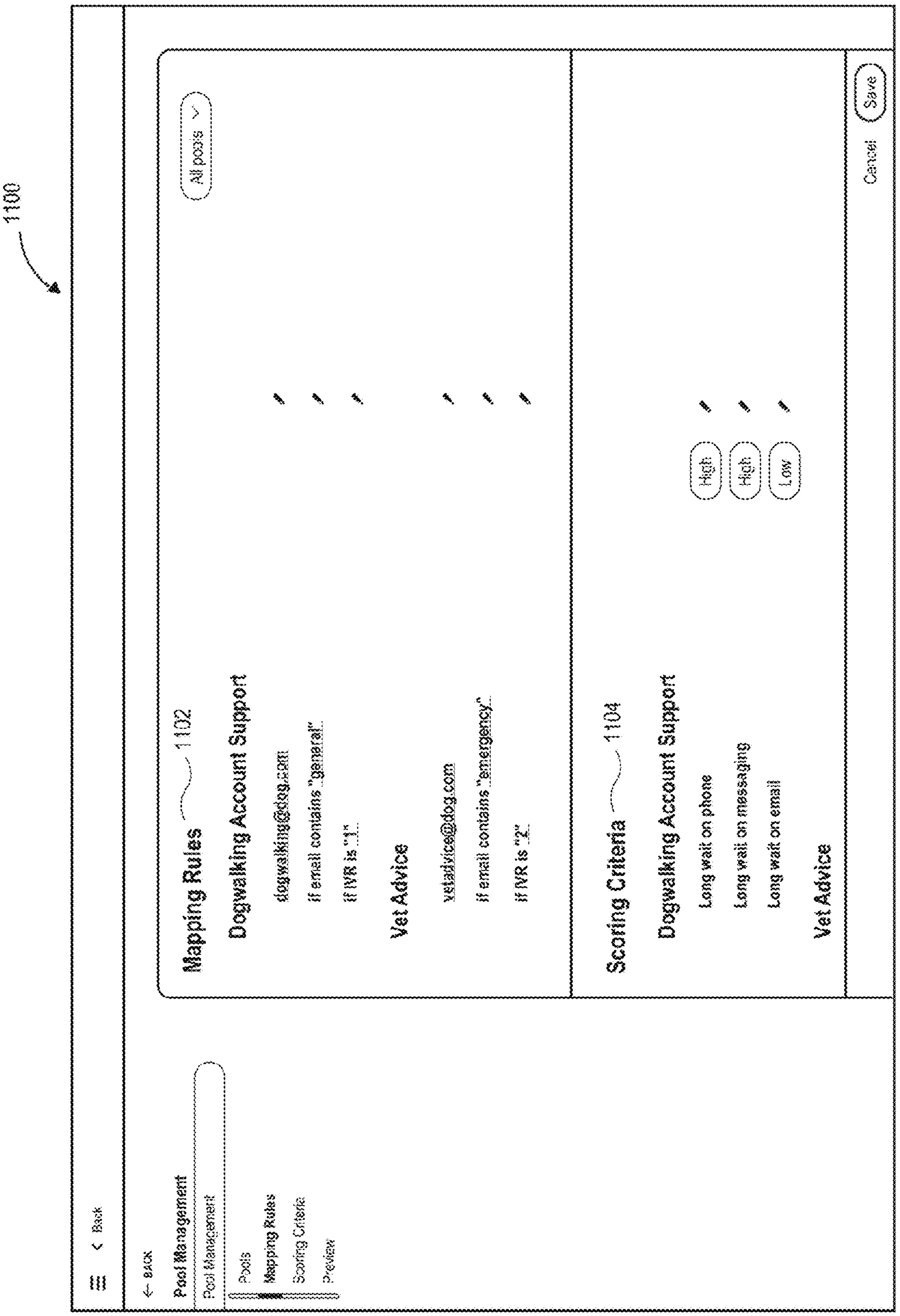
FIG. 11 illustrates one embodiment of an administration interface for providing mapping rules and scoring criteria.
Figure 12:
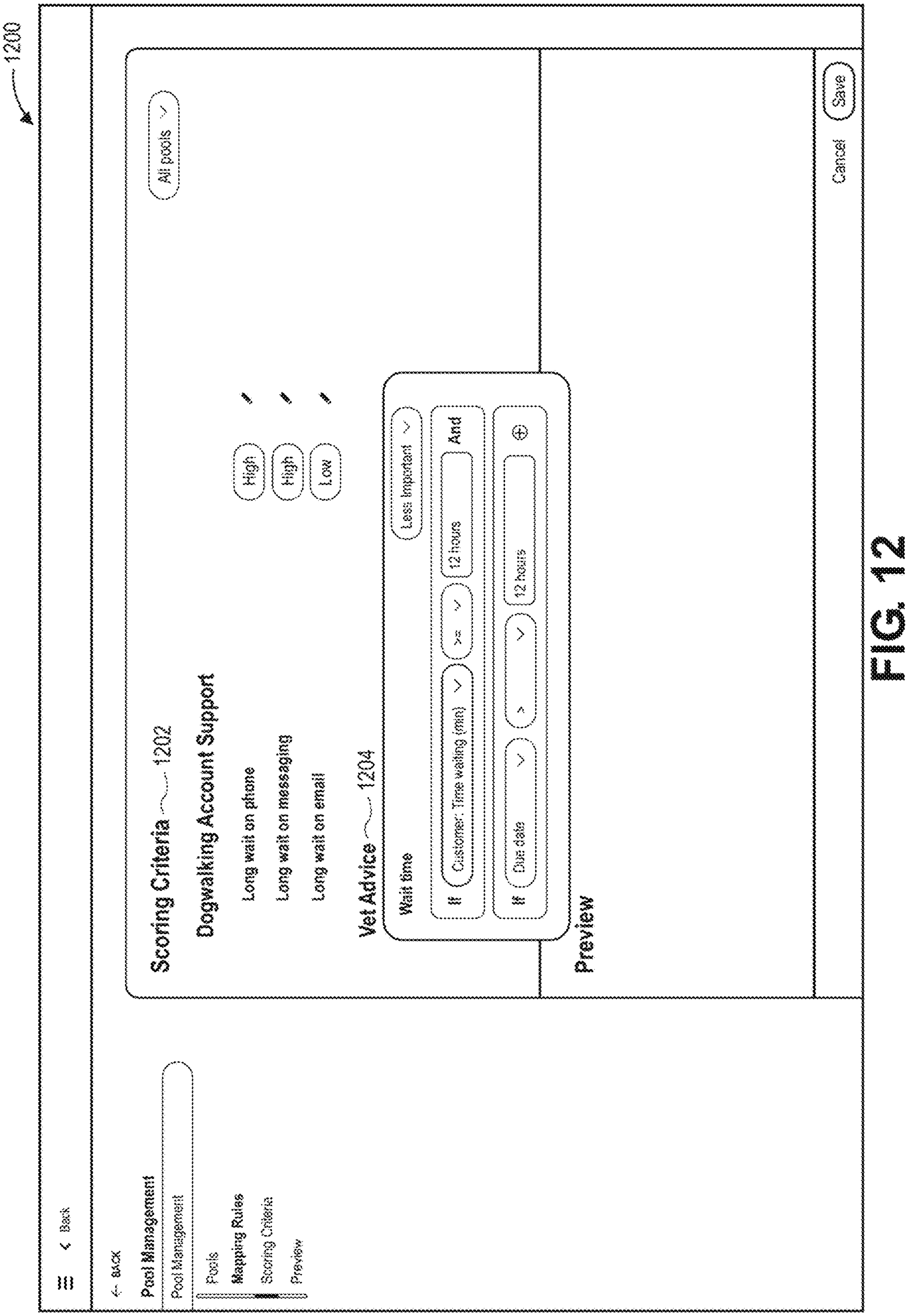
FIG. 12 illustrates one embodiment of an administration interface for providing scoring criteria for an exemplary account.
Figure 13:
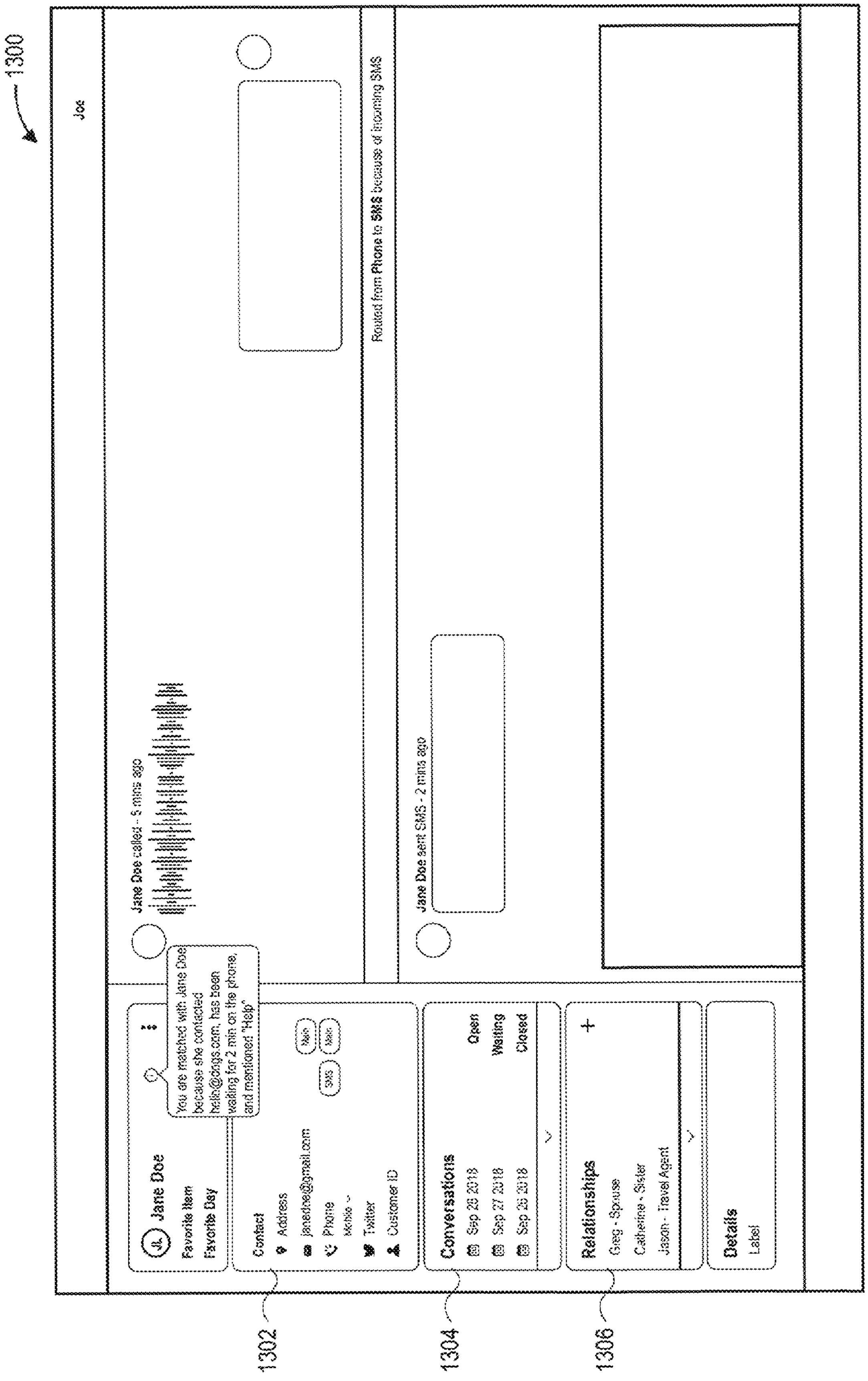
FIG. 13 illustrates one embodiment of an interface for an agent to help customers across multiple channels.

FIGS. 11-13 show additional routing interface examples for the routing techniques disclosed herein. Referring to FIG. 11, an administration interface 1100 is shown for providing mapping rules and scoring criteria according to one embodiment. Interface 1100 includes mapping rules 1102 which can identify parameters to define mapping rules 1102. In this example, there are parameters for dogwalking and vet advice. Interface 1100 includes scoring criteria 1104 to assist in determining scoring. Parameters such as long wait on phone or messaging can be classified as "High," which can be provided with a higher score in determining a pair scoring between an agent and customer. Referring to FIG. 12, an interface 1200 for providing scoring criteria is shown for an exemplary account according to one embodiment. Interface 1200 includes scoring criteria 1202 that provides a window 1204 for Vet advice having Boolean inputs on how to classify parameters to determine scoring. A section for preview 1206 is also shown. Referring to FIG. 13, an agent interface 1300 is shown according to one embodiment. Interface 1300 includes contact 1302, conversation 1304, and relationships sections 1306 for an agent to interface with customers.

Data Tracking and Generation for Workforce Management

Figure 14:
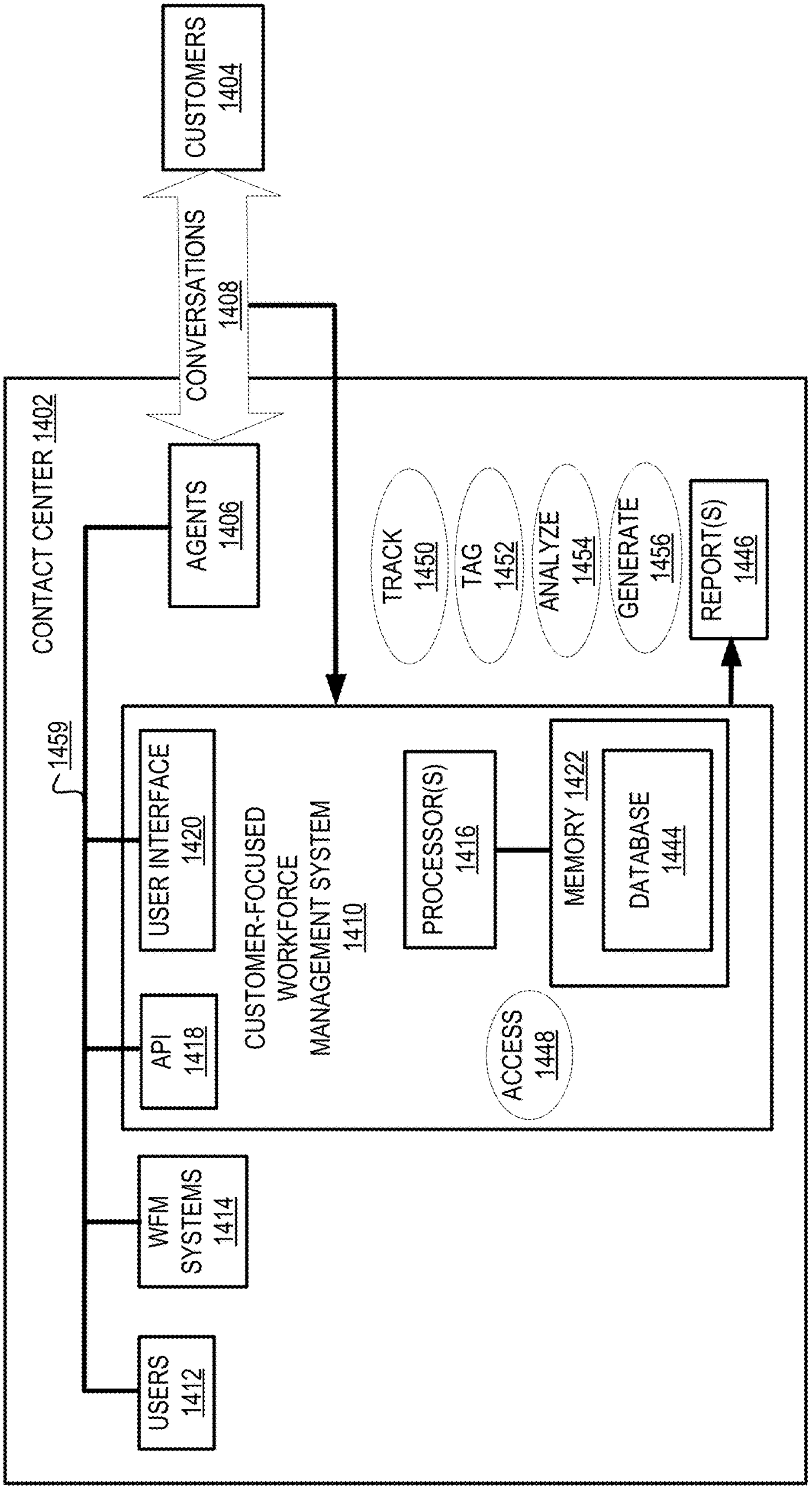
FIG. 14 illustrates one embodiment of a contact center with an accessible customer-focused workforce management (WFM) system.

FIG. 14 illustrates one embodiment of contact center containing a workforce management (WFM) system. In one embodiment, the WFM is a customer-focused WFM system. Note that although the WFM system is shown as part of the call center in FIG. 14, this is not required. The WFM system may be remotely located with respect to the contact center and accesses data tracked and generated by the contact center.

Referring to FIG. 14, customers 1404 of a business or company and agents 1406 in a contact center 1402 (owned or contracted by the business or company) have various conversations 1408, which the workforce management system 1410 tracks, in the track 1450 action. In one embodiment, each conversation corresponds to the series of communications between each customer of customers 1404 and each agent of agents 1406 that occurs during one communication session over one communication channel.

In one embodiment, a network 1459 couples the workforce management system 1410 and users 1412, other workforce management systems 1414 and the agents 1406. The network 1459 could be wired or wireless, or combination thereof, and further embodiments of connections are readily devised. Embodiments of the workforce management system 1410 could support multiple businesses or companies, or support or be owned by one business or company.

In one embodiment, agents 1406 are individuals working for the contact center 1402, but in further embodiments could be bots (e.g., artificial intelligence entities with natural language programming for voice and/or text communication), or various mixes of humans and bots. In some embodiments, some or all of the agents 1406 work remotely and are not necessarily physically in a contact center 1402 building(s).

Connections to the contact center 1402 for the conversations 1408 could include phone lines (e.g., one or more phone line trunks) and one or more networks (e.g., the Internet), which could be separate from or connected to the network 1459 within the contact center 1402 (e.g., a local area network or LAN and/or wireless area network or WAN) in various embodiments.

One or more processors 1416 in the workforce management system 1410 are coupled to a memory 1422 in which the system establishes and maintains a database 1444 and performs various actions for input, tracking, data analysis and access to the database 1444. In one embodiment, the actions the system performs include track 1450 for tracking the conversations 1408 and customers 1404, tag 1452 for tagging the conversations 1408, and analyze 1454 for analyzing the tagged conversations 1408.

The system provides or supports access 1448 for accessing the database 1444, for example by agents 1406 through the user interface 1420, and by users 1412 and other workforce management systems 1414 through the application programming interface (API) 1418 provided by the workforce management system 1410. In one embodiment, the system performs a generate 1456 action to produce reports 1446. Further actions that the processor(s) 1416 of the workforce management system 1410 can perform for data tracking and generation for workforce management are readily devised in keeping with the teachings herein. Some embodiments have portions or all of the system combined with or integrated with various embodiments of a contact center, routing ecosystem and data flow and routing database described above with reference to FIGS. 1A-13.

FIG. 15 illustrates one embodiment of the database 1444 used by the workforce management system 1410 of FIG. 14. The database 1444 is used by the workforce management system 1410, and more specifically the processor(s) 1416, to track customers 1404 and conversations 1408. The system stores and tags the conversations 1408 to annotate the conversations 1408 with various pieces of information about the conversations, and records the tags 1502 in the database 1444 in association with the appropriate customer ID 1504. Many customers 1404, and their customer IDs 1504, can be tracked in the database 1444. Each customer 1404 can have one or more conversations 1408, which are tracked in the database 1444. In one embodiment, each conversation 1408, identified by a conversation ID 1505, can have one or more conversation items (contact items) 1706 (see FIG. 17), which are tracked in the database 1444, with tags 1502, as follows.

In one embodiment, each conversation item (contact item) 1706 has a conversation item ID (contact item ID) 1506, a conversation type (contact type) 1508, a channel ID 1510, a direction 1512, begin time 1514, an end time 1516, a service level agreement (SLA) 1518, a status 1520, an agent ID 1522, and an inbox ID 1524, or various combinations or variations thereof or further tags 1502 in various embodiments. In various embodiments, contact items could be tagged with one or more of the following: a contact item identifier, a contact type, a channel, a direction with respect to the participants, a beginning timestamp indicating when a conversation related to the contact item began, an end timestamp indicating when a conversation related to the contact item ended, a service level agreement (SLA), a SLA fulfillment time or timestamp, information indicating whether the contact item was answered within an established SLA, a conversation routing timestamp indicating when a conversation was routed, status information related to the contact item indicative of whether a conversation was answered, abandoned, unanswered, or unknown, a calculated handle time for a work session indicating an amount of time taken to handle a matter, a wrap time indicating an amount of time that has passed since a contact has ended, or an agent identifier.

In one embodiment, the customer ID 1504 identifies the customer. In one embodiment, the customer ID 1504 identifies the customer, for example by name or number. The conversation ID 1505 identifies each conversation 1408. In one embodiment, the conversation ID 1505 identifies each conversation 1408 by a descriptor and one or more of a letter, a number count, a code, a date, or a timestamp, etc. The conversation item ID (contact item ID) 1506 identifies each contact item with a conversation item ID (contact item ID) 1506 (e.g., conversation item (contact item ID) 1706) in a conversation 1408.

In one embodiment, conversation type (contact type) 1508 identifies a type of each conversation of each conversation item with a conversation item ID item (e.g., conversation item 1706) in a conversation 1408. In one embodiment, the conversation type (contact type) 1508 can specify communication types of a number of different channels, including, but not limited to, a phone call, a text message, a voice message, an email, a text chat and a video chat. Other contact types may be considered and readily devised in various embodiments.

In one embodiment, channel ID 1510 identifies the channel over which the conversation item takes place and, in one embodiment, includes a voice channel identifier identifying a specific voice channel (e.g., a telephone number or other identifier), a text channel identifier identifying a specific text channel (e.g., a short messaging service (SMS) capable cellular telephone number or other identifier), a voicemail channel identifier, an email channel identifier (e.g., an email address or other identifier), a chat channel identifier for text chats over the Internet or other network, and a video chat channel identifier for video chats, e.g., over the Internet or other network.

In one embodiment, direction 1512 identifies whether the conversation 1408 is initiated by a customer 1404 (e.g., from customer to agent) or is initiated by an agent 1406 (e.g., from agent to customer), and may also indicate whether the conversation is unidirectional (e.g., a single message) or bidirectional (e.g., an exchange of messages or conversation) in some embodiments.

In one embodiment, begin time 1514 and end time 1516 are timestamps of the conversation 1408 and conversation item(s) (e.g., conversation items 1706), and could also be labeled start and finish, initiate and close, enter and exit, etc.

In one embodiment, SLA 1518 identifies a service-level agreement. In one embodiment, the system allows SLA 1518 to differ among customers (e.g., customers could have one tier of service for free or for a period of time but pay for higher tiers of service, be within or outside of a warranty period, have purchased an extended warranty, or be a preferred customer, etc.) Status 1520 could indicate an issue is open, escalated, urgent, resolved, short-term, long-term, affects other products or an entire product line or closed, etc. Agent identifier 1522 identifies the agent(s) involved in the conversation. In another embodiment, this identifies the agent as primary agent or initial agent, secondary or supervising agent, or other role for the agent relative to the conversation 1408.

Figure 16:
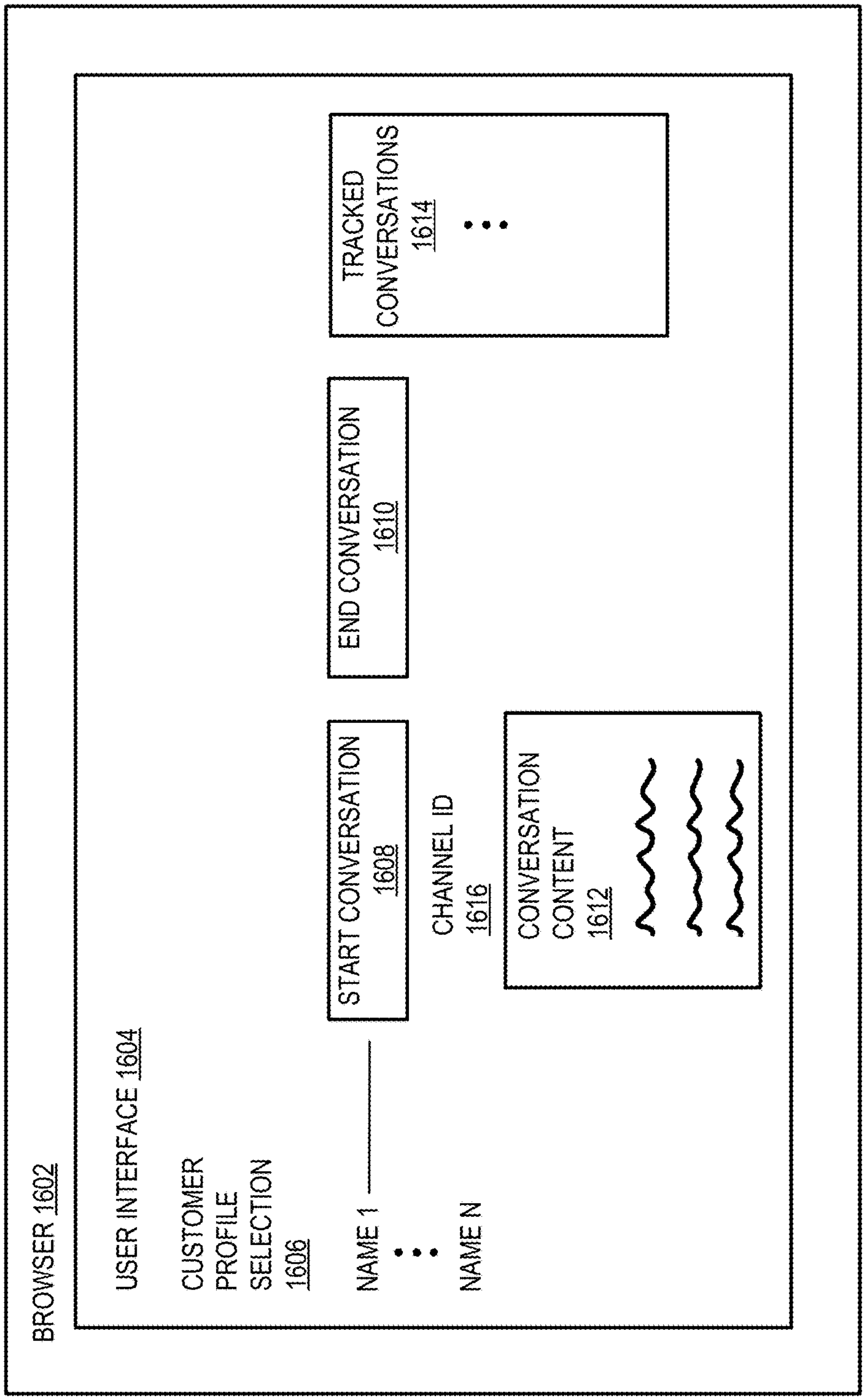
FIG. 16 illustrates one embodiment of a user interface for use in the workforce management system of FIG. 14.

FIG. 16 illustrates one embodiment of a user interface used in the workforce management system of FIG. 14. In one embodiment, the user interface 1604 is displayed on a browser 1602. In another embodiment, the user interface 1604 is displayed through standalone applications executing on a wired or wireless connected computing device with display, e.g., any of various computers and mobile devices, etc. The user interface 1604 displays a customer profile selection 1606 with names or other identifiers of customers 1404 to an agent 1406 using a display of the system. The customer profile is selectable by the agent 1406. In one embodiment, selecting the customer profile initiates a conversation and/or is automatically displayed when a customer initiates a conversation to the agent 1406. In one embodiment, the conversation is routed to the agent 1406, e.g., by systems and methods described with reference to FIGS. 1-13. The agent sees conversation content 1612 in the user interface 1604 (or in a separate display region in further embodiments), such as, for example, text content of a text message(s) or email(s), or speech recognition transcript from voicemail or live voice conversation, and/or has live or replay audio or video, in various embodiments. Other tracked conversations 1614 are also visible in some embodiments. In one embodiment, the conversation is started or stopped with a start conversation button 1608 and an end conversation button 1610. Alternatively, these can be inferred and displayed based on actions taken to initiate or end a conversation through an appropriate channel, as shown on the channel ID 1616. Variations and further versions of user interface are readily devised in keeping with the teachings herein.

FIGS. 17A-D illustrate various embodiments of derived data, including work bursts 1702 and work sessions 1704 with examples involving various numbers of channels and agents 1406. Work bursts and work sessions are described in more detail below. Based on tracking customers 1404 and conversations 1408, a system, such as, for example, workforce management system 1410, and more specifically the processor(s) 1416, derive various forms of data, track the derived data in the database 1444 in association with customers 1404 (and customer profiles) and conversations 1408, and provide the data as an input for functions performed by a workforce management system, such as, for example, generating reports 1446 with the derived data, as further described below.

One embodiment of the workforce management system 1410 and the data that is tracked and generated for use thereby is provided below. The following description provides multiple examples to illustrate these concepts.

Tracking Work in a One Embodiment of a Workforce Management System

In one embodiment, when an agent 1406 is logged into the workforce management system 1410, the system has access to and can analyze what that agent 1406 is viewing on the display screen, for example, through monitoring the user interface 1604. In one embodiment, when an agent 1406 views a customer's profile, the system operates on the assumption that the agent 1406 is working to help that customer 1404, and when the agent 1406 navigates away from the customer profile, then the system operates on the assumption that the agent 1406 is no longer working to help that customer 1404. Thus, when an agent 1406 is viewing a customer's profile, the system tracks this time as time an agent 1406 is working on or with a customer 1404.

Key Objects in the Workforce Management System

In one embodiment, the workforce management system 1410 puts people at the center (i.e., takes a customer-focused or customer-centric approach) with a platform built for all communication channels, from voice to messaging. In one embodiment, putting people at the center means that the system does not have tickets nor cases. Instead of case and ticket-based metrics, or in some embodiments augmenting case and ticket-based metrics, various embodiments of the system have customer-based metrics.

In one embodiment, the objects in the workforce management system 1410 are organized in a few different levels as discussed below.

1. Customer—At the highest level, the system has the customer 1404. This is the customer 1404 of a business or company, and the person whom agents 1406 help. Customers 1404 can have certain attributes like, for example, a CSAT score, Lifetime Value, or Loyalty status and more. In one embodiment, all customers also have a customer ID 1504, which identifies both the customer 1404 and the customer profile in the database 1444.

2. Conversation—Throughout a customer's lifetime, a customer 1404 can have many conversations 1408 with a company (or, more precisely, conversations 1408 with one or more agents 1406 who represent or are otherwise associated with the company). In one embodiment, however, a customer can only have one open conversation 1408 at a time (but potentially a large number of closed conversations in the past). In one embodiment, conversations can span multiple channels, agents or time (e.g., minutes, days, etc.). In one embodiment, a customer could have one open conversation 1408 that has multiple active conversation items or contacts at one time, e.g. an SMS and a chat interaction going at the same time. For a further example, the open conversation(s) could include communicating by voice (e.g., a voice call to request or comment on a document or image) and email or text messaging with image attachment(s) (e.g., messaging to send or receive a document or image or further comment in text, etc.).

In one embodiment, each of these conversations 1408 has certain attributes. In one embodiment, these attributes includes topics, created timestamp (e.g., begin time 1514), closed timestamp (e.g., end time 1516), channels (e.g., channel ID 1510) present within a conversation 1408, and more. In one embodiment, all conversations 1408 have a conversation ID 1505 and exist within an inbox or equivalent.

3. Conversation Item—In one embodiment, each conversation 1408 can be composed of one or more conversation items 1706 (e.g., messages, emails, voice, voice messages, videos, etc.). In one embodiment, each of the conversation items are identified by conversation item ID (contact item ID) 1506 and conversation type (contact type) 1508).

For the voice channel, a conversation item 1706 is a phone call, e.g., by a landline call, a mobile phone call, etc.

For messaging-based channels (e.g., chat, SMS, Facebook Messenger, Twitter DMs, etc.), a messaging item (or messaging session) is a collection of messages between the agent 1406 and the customer 1404.

For mail-based channels (e.g., email, voicemails, abandoned call follow-ups (not the original call itself), etc.), a mail item (or mail session) is a collection of emails, voicemails, abandoned call follow-ups, etc. In one embodiment, the system regards an email session as a "chat session" that contains emails instead of chat messages.

In one embodiment, conversation items 1706 have certain attributes that include a channel (e.g., identified by channel ID 1510), created at timestamp (e.g., begin time 1514), ended at timestamp (e.g., end time 1516), a direction (e.g., direction 1512), an SLA (e.g., SLA 1518), a status (e.g., status 1520). In alternative embodiments, conversation items 1706 has more and less attributes.

4. Work Sessions—When agents, such as agents 1406, work with a customer 1404 within the workforce management system 1410, a work session 1704 is created in the system. In one embodiment, a work session 1704 is created for any agent-customer-channel combination. If the agent 1406 returns to help the same customer, over the same channel, the work session 1704 continues. In one embodiment, a new work session 1704 is created if the agent 1406 is starting to help the customer, if the channel changes (be it by the customer or the agent), or if another agent starts helping the customer. In one embodiment, a work session 1704 ends when the conversation item 1706 ends or when the agent ID 1522, inbox ID 1524, conversation item ID 1506, conversation ID 1505, or channel (e.g., channel ID 1510) changes. In one embodiment, a work session 1704 has attributes like a started at timestamp, an agent ID 1522, and a handle time. In one embodiment, the handle time for a work session 1704 is the sum of the duration all the Work Bursts (described below) that have the same agent ID, inbox ID, item ID, conversation ID, and channel.

5. Work Bursts—At the lowest level, the system derives and tracks work bursts 1702. In one embodiment, a work burst (e.g., work burst 1702) starts when an agent views the customer's profile and ends when an agent navigates away from that customer's profile. In one embodiment, each time an agent views the customer's profile, a new work burst 1702 is created. In one embodiment, work bursts 1702 have certain attributes that include a start timestamp, end timestamp, and work session ID. In one embodiment, work bursts 1702 are the individual lengths of uninterrupted time when an agent is looking at a customers' profile, and the duration of a work session 1704 is the sum of the duration of the work bursts 1702 associated to it.

Figure 17A:
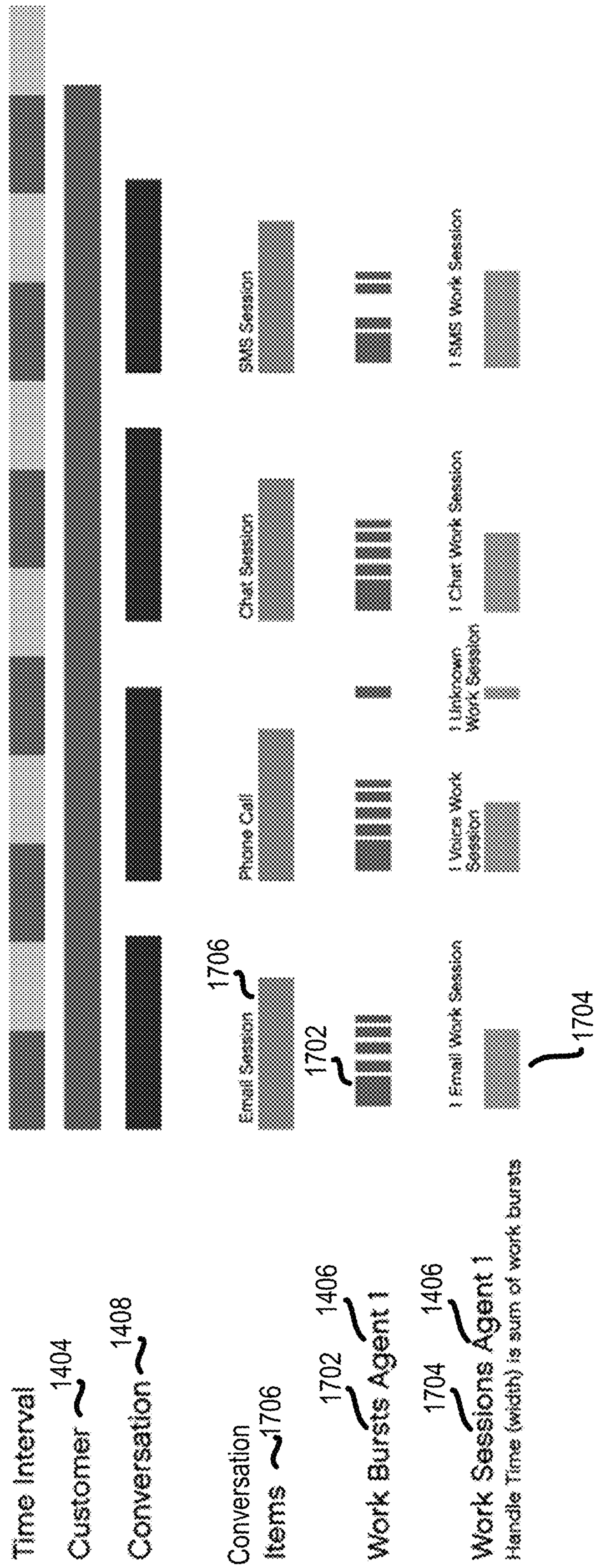
FIG. 17A illustrates one embodiment of derived data, e.g., work bursts and work sessions involving a single channel and a single agent, that is tracked in the database in the workforce management system of FIG. 14.

FIG. 17A illustrates one embodiment of derived data, e.g., work bursts 1702 and work sessions 1704 involving a single channel and a single agent 1406, that is tracked in the database 1444 in the workforce management 1410 system of FIG. 14.

Example 1: Single Channel and Single Agent. In this example, the "bricks" labeled "Work Bursts Agent 1" represent the many work bursts 1702 that occurred while an agent 1406 was working with the customer 1404. The sum of all of the work bursts 1702 is equivalent to the Work Session Handle Time.

To determine the channel, when a work session 1704 occurs, the system looks to see what conversation items 1706 are present in the conversation 1408. In one embodiment, when a new work burst 1702 is being created, the system looks for any conversation items 1706 currently active for that customer and derives the channel for them. In one embodiment, if there is a single active conversation item 1706, the system uses its channel, and if there are more than one conversation item 1706, the system assigns the channel according to a hierarchy based on how 'synchronous' the channel is. For example, if assigning according to three channel types, the following hierarchy is used:

if there's a phone call included in the conversation items 1706, it takes precedence and the system derives the channel as the telephone channel;

if there's no phone call, but there's a messaging channel type, then it takes precedence and the system derives the channel as the messaging channel; and if there's no phone call and no messaging channel type, then the system derives the channel as the email channel.

In this example, only one channel is present during each work session 1704 so each work session 1704 is assigned the channel of that conversation item 1706.

If no conversation item 1706 is present in the conversation 1408 at that time, the system still keeps track of the work session 1704 and assigns an "unknown" channel to the work session 1704. In further embodiments, these "unknown" sessions will be split up between after contact work, outbound work, and more. In one embodiment, the system does not determine the channel and channel type when there aren't any active conversation items. Alternatively, in one embodiment, the system determines the channel later, by examining what channel the agent chooses to use to contact the customer. For example, an agent in a sales capacity opens a customer profile with no active conversation items and calls them to offer a product. At first, the channel type would be determined to be unknown, but once the call starts, the system goes back and attributes the channel type to be that of a telephone channel.

Figure 17B:
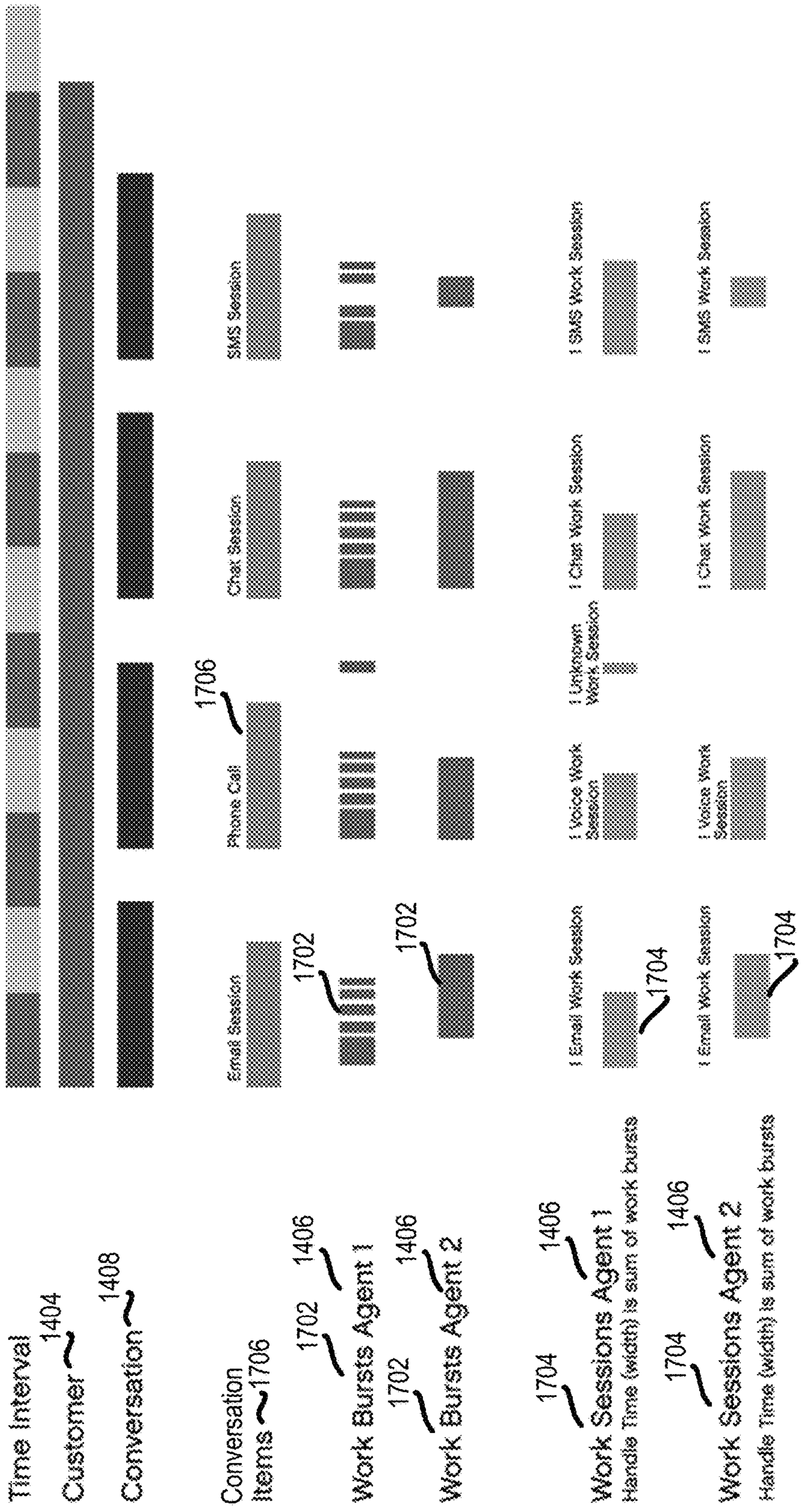
FIG. 17B illustrates one embodiment of derived data, e.g., work bursts and work sessions involving a single channel and multiple agents, that is tracked in the database in the workforce management system of FIG. 14.

FIG. 17B illustrates one embodiment of derived data, e.g., work bursts 1702 and work sessions 1704 involving a single channel and multiple agents 1406, that is tracked in the database 1444 in the workforce management system 1410 of FIG. 14.

Example 2 Single Channel and Multiple Agents. In this example, two agents 1406 are working on the same conversation item 1706. Since both agents 1406 are working on that conversation item 1706, both agents 1406 receive credit for their work. In order to do that, the system creates a work session 1704 for each agent 1406.

Similar to the scenario with one agent 1406, the system sums the work bursts 1702 to determine the Work Session Handle Time. To determine the channel, when a work session 1704 occurs, the system looks to see what conversation items 1706 are present in the conversation 1408. In this example, only one channel is present during each work session 1704 so each work session 1704 is assigned the channel of that conversation item 1706.

Figure 17C:
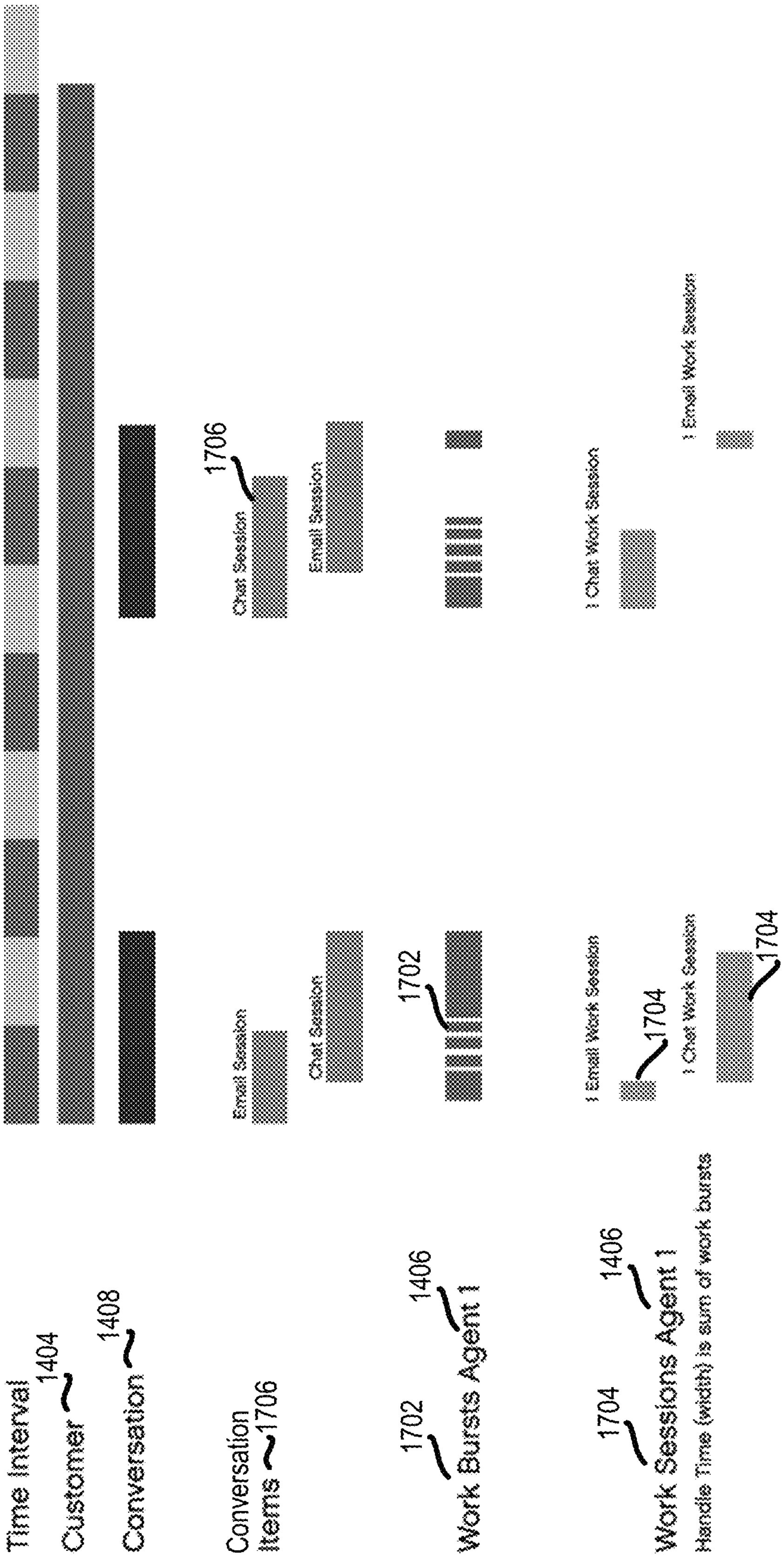
FIG. 17C illustrates one embodiment of derived data, e.g., work bursts and work sessions involving multiple channels and a single agent, that is tracked in the database in the workforce management system of FIG. 14.

FIG. 17C illustrates one embodiment of derived data, e.g., work bursts 1702 and work sessions 1704 involving multiple channels and a single agent 1406, that is tracked in the database 1444 in the workforce management system 1410 of FIG. 14.

Example 3: Multiple Channels and Single Agent. In this example, there is more than one conversation item 1706, spanning more than one channel within one conversation 1408 and with one agent 1406. In one embodiment, the system sums the work bursts 1702 to determine the Work Session Handle Time.

Here, in one embodiment, two channels overlap, so the system defines the channel by the most synchronous item (voice>messaging>mail). In one embodiment, if there are two conversation items 1706, the system uses the most synchronous, most recently routed conversation item 1706 to determine the channel. Therefore, in this example, the agent 1406 has one Email Work Session and one Chat Work Session.

Figure 17D:
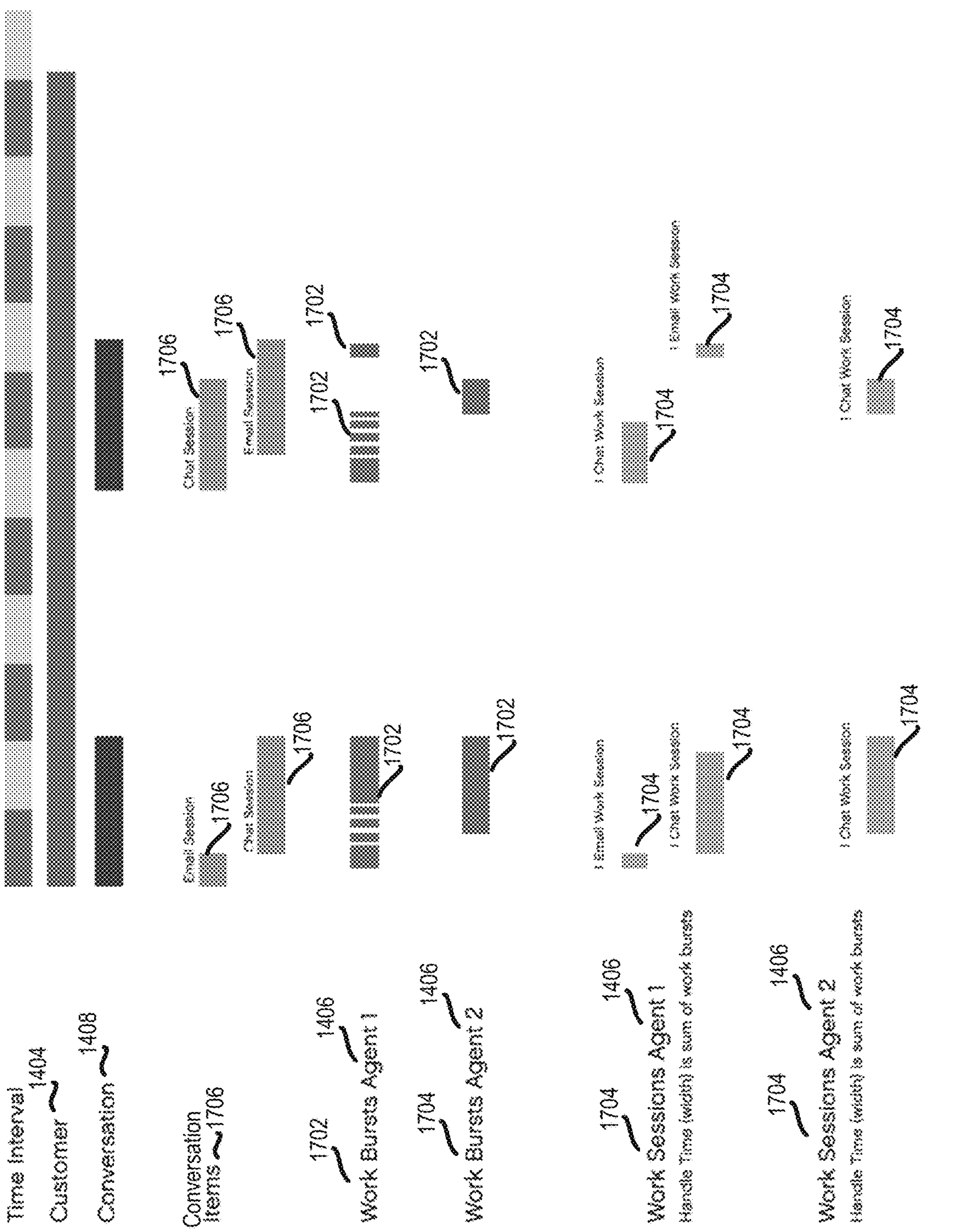
FIG. 17D illustrates one embodiment of derived data, e.g., work bursts and work sessions involving multiple channels and multiple agents, that is tracked in the database in the workforce management system of FIG. 14.

FIG. 17D illustrates one embodiment of derived data, e.g., work bursts 1702 and work sessions 1704 involving multiple channels and multiple agents 1406, that is tracked in the database 1444 in the workforce management system 1410 of FIG. 14.

Example 4: Multiple Channels and Multiple Agents. In this example, multiple agents 1406 are working on multiple conversation items 1706 within a conversation 1408. In one embodiment, the system sums the work bursts 1702 to determine the Work Session Handle Time and define the channel by the most recently routed and most synchronous item (voice>messaging>mail). Each agent 1406 will also have multiple work sessions 1704.

Thus, in one embodiment, when using the workforce management system 1410 WFM data

- Work sessions 1704 track time that agents 1406 are on a customer's profile, which is equivalent to the time agents 1406 are working;
- Work sessions 1704 start/pause when agents 1406 see/leave a customer's profile;
- Work sessions 1704 are tracked irrespective of assignment (e.g., two agents 1406 looking at a customer and associated customer profile at the same time will both get work sessions 1704);
- The work session channel is defined by the channel of the most recently routed conversation item 1706 and most synchronous channel (phone>messaging>mail); and
- If any of the following happens, a new work session 1704 starts:
  - A new agent 1406 starts working on that customer 1404 (e.g., agent ID 1522 changes);
  - A new conversation item 1706 on a different channel comes in (e.g., conversation item ID 1506 changes, conversation item session ends, or channel changes);
  - The customer 1404 is assigned to another inbox (e.g., inbox ID 1524 changes);
  - A customer 1404 receives a response (e.g., item session ends); and
  - A new conversation starts (e.g., conversation ID changes).

Figure 18:
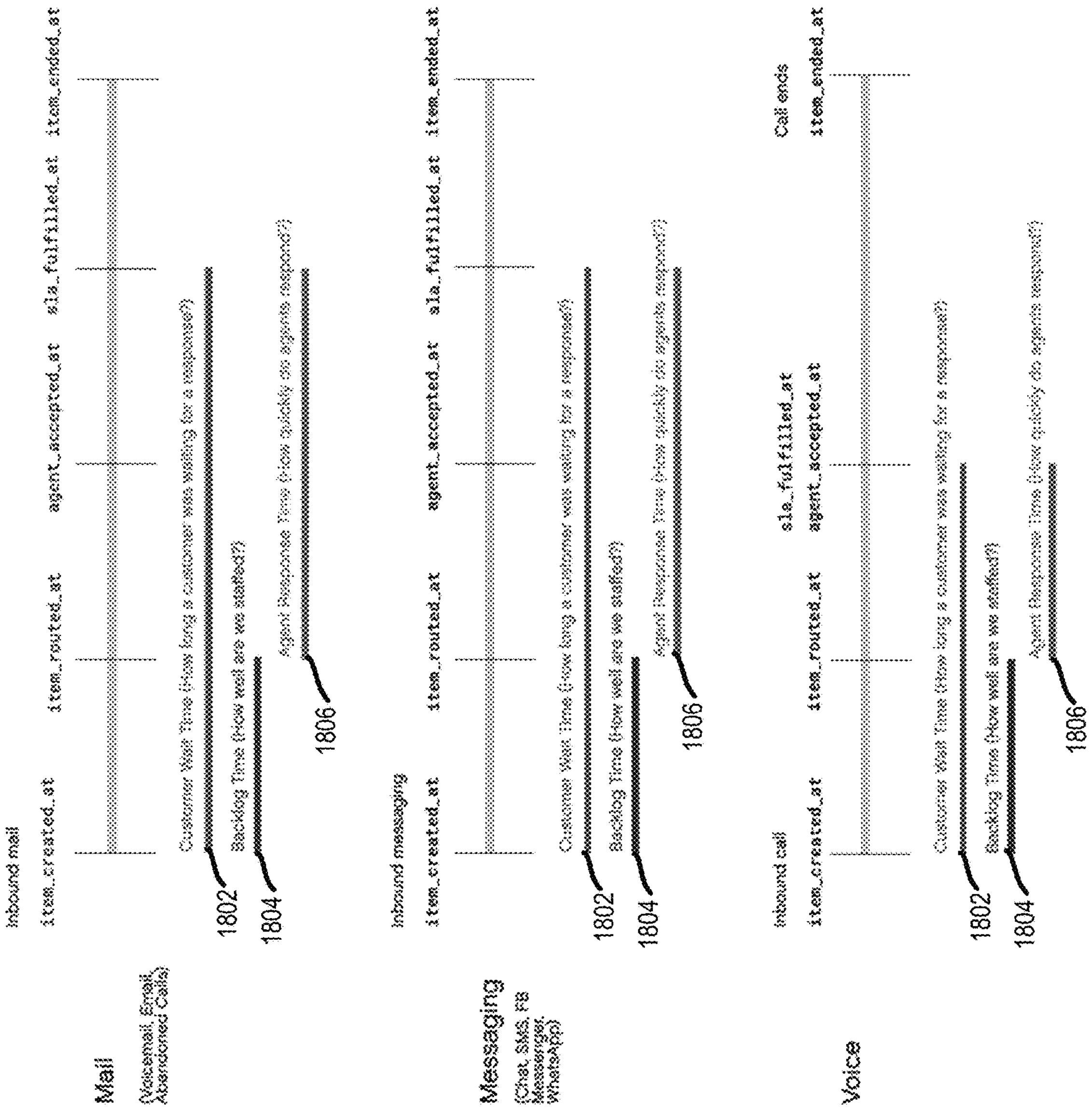
FIG. 18 illustrates a further embodiment of derived data, e.g., customer wait time, backlog time and agent response time, that is tracked in the database in the workforce management system of FIG. 14.

FIG. 18 illustrates a further embodiment of derived data, e.g., customer wait time, backlog time and agent response time, that is tracked in the database in the workforce management system of FIG. 14. In various embodiments, the workforce management system provides various types of derived data for workforce management, as further described below.

Data Output. Because of the different levels of data of which the workforce management system 1410 has access, the system can determine certain details such as which agents 1406 worked on what conversation items 1706 and for how long. In one embodiment, the system generates two reports to help a user or other WFM systems understand these details. These reports are referred to herein as the Work Session Report and the Work Burst Report. In one embodiment, the Work Session Report has all of the detail that WFM systems needs in order to create a schedule with respect to the number of individuals that are needed to provide coverage for all the communication channels being handled for the call center. In one embodiment, the Work Burst Report provides a granular view of each work burst 1702 which is often more detail than WFM vendors need. In various embodiments, work session reports or work burst reports are generated on a per agent, per customer, per channel, or per contact center basis, or combination thereof.

The following description provides further detail about the main event timestamps.

Example Timelines

In one embodiment, the Work Sessions Report provides five event timestamps that are useful for calculating key WFM metrics like Backlog Time 1804, Customer Wait Time 1802, and Agent Response Time 1806. In one embodiment, the event timestamps are referred to herein as:

| |
|---|
| item__created__at |
| item__routed__at |
| agent__accepted__at |
| sla fulfilled__at |
| item__ended__at |

The timelines in FIG. 18 illustrate when specific events can occur in relation to each other. Note that in one embodiment, a sixth timestamp is provided and is referred to herein as:

work_session_started_at

In one embodiment, this timestamp occurs when the agent first views the profile which is normally the same time as item_routed_at.

The following description details how and when these events can occur.

In one embodiment, event timestamps include:

item_created_at_and_item_ended_at and these events occur when:

| Item Type | Created | Ended |
|---|---|---|
| Mail (e.g., Voicemail, Email, Abandoned Calls) | Mail Received | Agent responds on any channel<br>Agent chooses "No Reply Needed"<br>Agent closes Conversation |
| Messaging (e.g., Chat, SMS, FB Messenger, WhatsApp) | Message Received | A messaging session can end in various ways: the agent was the last responder in the chat and a predetermined period of time (e.g., 15 minutes) have elapsed (this time period can be adjusted) |

-continued

| Item Type | Created | Ended |
|---|---|---|
| | | the customer was the last responder in the chat and a predetermined period of time (e.g., a certain number of hours (e.g., 1 hour, 2 hours, 12 hours, 24 hours, etc.) have elapsed<br>the agent or a rule closes the conversation<br>the agent or a rule marks the message as "No Reply Needed"<br>Additionally, chat sessions can be ended if:<br>the agent manually ends the chat from the UI<br>the customer leaves the chat<br>the customer closes their browser |
| Voice | Phone call Received | Agent or Customer hangs up the phone<br>Call is dropped |

In one embodiment, these timestamps are null when the conversation has not yet ended or if the conversation item was ended without proceeding through some of these steps. In one embodiment, all conversation items 1706 will have a created timestamp, and all conversation items 1706 are auto-ended based on a configuration set by a system administrator. In one embodiment, this auto-end timeout can be set to any number. In one embodiment, the system also configures this number by channel.

In one embodiment, the number of events per item for these timestamps include one item_created_at and one item_ended_at timestamp.

In one embodiment, the event timestamps include the following:

item_routed_at and this event occurs when:

a) The agent 1406 is first offered the conversation item 1706 (regardless of whether the agent 1406 accepted the conversation item 1706 or not).

b) The agent 1406 assigns the conversation (and thus the conversation item 1706) to self c) An agent 1406 sends an outgoing message in a conversation that nobody accepted yet. In this case, in one embodiment, the workforce management system 1410 assigns the conversation item 1706 to that agent 1406 and gives item_routed_at and sla_fulfilled_at the same timestamp.

In one embodiment, the item_routed_at timestamp is null when the conversation is assigned to another agent and then second agent responds before the first agent responds. In another embodiment, the item_routed_at timestamp is provided for all agents who are routed the work, regardless of who responds first. And in another embodiment, the item_routed_at timestamp is provided for the first time a conversation item is routed for each agent who worked on the conversation item.

In one embodiment, with respect to the number of events per item for the item_routed_at event, the same conversation item 1706 can have multiple item_routed_at timestamps. The different timestamps will be associated with different work sessions 1704. In another embodiment, multiple work sessions are not created for each item_routed_at event, but instead the earliest of the timestamps for that agent and contact session is given. In yet another embodiment, work sessions are created for every Conversation Item-to-Agent grouping, and the earliest timestamp of the item_routed_at event is given for each agent. This approach provides less data than the one above, but it's more concise for system integration—so all are valid approaches for various embodiments.

In one embodiment, the event timestamps include:

agent_accepted_at and the event occurs when:

a) the agent 1406 clicks "accept" on an offered conversation item 1706.

In one embodiment, the agent_accepted_at timestamp is null when:

a) An agent 1406 manually assigns a conversation to self, or b) An agent sends an outgoing message in a conversation that nobody accepted yet. In this case, the workforce management system 1410 assigns the conversation item 1706 to that agent 1406 and there is no agent_accepted_at timestamp. In another embodiment, the agent_accepted_at timestamp is automatically filled in these situations.

In one embodiment, with respect to the number of events per conversation item 1706 for the agent_accepted_at timestamp, the same conversation item 1706 can have multiple agent_accepted_at timestamps. The different timestamps will be associated with different work sessions 1704. In another embodiment, the earliest agent_accepted_at timestamp is given for each agent who worked on the conversation item, and only one work session is created for each Conversation Item-to-Agent grouping.

In one embodiment, the event timestamps include:

sla_fulfilled_at and the event occurs when the first of these happen:

a) An agent 1406 sends an outbound communication to the customer 1404.

An outbound communication can be an outbound email, SMS message, chat message, FB message, or an outbound call to the customer 1404 (regardless of whether the customer 1404 answered the call).

Phone calls can fulfill the SLA 1518 when an agent 1406 answers an inbound call from the customer 1404, when the customer 1404 chooses to have their inbound call forwarded outside the customer engagement system via IVR selection, when an unknown number calls in and abandons their call, which causes the conversation to be closed automatically, or when an agent 1406 and a customer 1404 complete the phone call, whether that phone call was inbound or outbound.

Outbound email sessions can fulfill the SLA when an outgoing email contains an email address from the customer profile in any of TO, CC, BCC. That includes forwarded emails as well.

Messaging sessions can fulfill the SLA 1518
- when an agent 1406 replies to an inbound chat, SMS, FB, WhatsApp message from the customer 1404, or
- when the chat session for that customer 1404 is ended, if previously there was not a reply from an agent 1406 (note: this excludes chat sessions that are ended as a result of a new chat session starting, which could happen if, for example, the user switches devices)

b) "No Reply Needed" is selected for an inbound conversation item 1706 in the same conversation 1408 (note: this can only be done on the last inbound email or message of the conversation 1408, but this selection fulfills any unfulfilled SLA 1518 in the conversation 1408)

c) The conversation 1408 is closed

In one embodiment, only inbound communications can be fulfilled, and this concept does not apply to outbound communications. In one embodiment, a chat may be ended without being fulfilled if it is never offered to and accepted by an agent 1406 and 24 hours have elapsed since the last customer message.

In one embodiment, the event is null when an agent 1406 accepted a session and never sent a response.

In one embodiment, with respect to the number of events per item, the same item can only have one sla_fulfilled_at timestamp, even if there are multiple work sessions associated with the same item.

WFM Metric Calculations

With the data that is tracked, a WFM system can perform calculations key WFM metrics (e.g., average handle times, customer wait time, backlog time, agent response time, etc.). These are described in more detail below.

For example, with respect to key WFM metrics, the data provided in the Work Sessions Report and Work Burst Report allows calculation for WFM and more. The following examples are recommended for calculating some key metrics such as handle time and customer wait time.

An Example of Average Handle Time

In one embodiment, to calculate handle time, two parameter values are useful, time and volume. For volume, one recommendation is to use "conversation items" which will give the number of phone calls, messaging sessions, and email sessions. Depending on what unit is preferred as a basis for staffing, WFM could also use "Conversations," "Customers" or "Work Bursts".

Inbound volume=count unique item id

Inbound volume per channel=count unique item_id grouped by channel

Inbound volume answered=count unique item_id with work_session_handle_time

Inbound volume answered per channel=count unique item_id with work_session_handle_time grouped by channel Using the above for volume, the second measure that is useful is time. In one embodiment, the Work Session Handle Time is used, which is the amount of time that agents 1406 spent working (e.g., the time viewing a customer profile).

Time agents worked=sum work_session_handle_time

Time agents worked per channel=sum work session handle time where channel is <channel>

After the volume and time measures have been determined, the overall handle time for a contact center can be determined. In one embodiment, the overall handle time for a contact center can be determined according to:

Overall Handle Time=time agents worked divided by inbound volume answered

Overall Handle Time per channel=time agents worked per channel divided by inbound volume answered per channel Note that in other embodiments, the average handle time may be calculated in a number of different ways.

An Example of Agent Average Handle Time

In one embodiment, to calculate handle time at an agent level, two parameter values are useful, time and volume. For volume, in one embodiment, "conversation items", which will give the number of phone calls, messaging sessions, and email sessions that an agent 1406 worked on, are used. In alternative embodiments, depending on what unit is preferred as a basis for staffing, WFM could also use "Conversations", "Customers" or "Work Bursts".

Items worked on=count of item_id where agent_id is <agent_id>

In one embodiment, this will give all of the conversation items 1706 on which an agent 1406 has worked. As discussed above, multiple agents 1406 can work on the same conversation item 1706.

Using the above for volume, the second measure to use is time. For this, in one embodiment, the Work Session Handle Time, which is the amount of time that agents 1406 spent working (e.g. the time viewing a customer profile), is used.

Time worked by agent=sum of work_session_handle_time where agent_id is <agent_id>

Since multiple agents 1406 can work on the same conversation item 1706, in one embodiment, the percentage of the work for a given conversation item 1706 the agent 1406 performed is determined according to the following:

Work Share % by agent by item=time worked by agent where item_id is <item_id> divided by sum of work_session_handle_time where item_id is <item_id>

In one embodiment, this is summed across all items that an agent 1406 worked on.

Work Share % by agent for all conversation items touched=summation of (time worked by agent where item_id is <item_id> divided by sum of work_session_handle_time where item id is <item id>) over all item_id where agent id is <agent_id>

An Example of Agent Average Handle Time

In one embodiment, once the Work Share percentage by agent is determined, it is then possible to calculate the average handle time. In one embodiment, average handle times are determined according to:

Agent Avg Handle Time=time worked by agent multiplied by work Share % by agent

Agent Avg Handle Time per channel=time worked by agent where channel is <channel> divided by share of items worked by agent where channel is <channel>

Examples of Customer Wait Time, Backlog Time, Agent Response Time

In one embodiment, using the timestamps item_created_at, item_routed_at, agent_accepted_at, sla_fulfilled_at, and item_ended_at, a variety of time-based metrics are calculated. In one embodiment, customer wait time, backlog time and agent response time are calculated as follows:

Customer Wait Time=sla_fulfilled_at−item_created_at where item_id is <item_id>

Backlog Time=item_routed_at−item_created_at where item_id is <item_id>

Agent Response Time=sla_fulfilled_at−item_routed_at where item_id is <item_id>

Examples of Additional Calculations

The following are some additional calculations that are made.

Abandoned Items=count abandoned

Inbound emails which required more than one channel=count conversation_id where channel of the first item id is email with more than 1 item_id associated Outbound items=count unique item id where direction is outbound Time spent on outbound SMS=sum work session duration of all rows with channel is <sms> and direction is outbound Email SLA Achievement=count rows where channel is email where within_sla is true divided by count of rows where channel is email where direction is inbound times 100

In one embodiment, the data that is tracked is used by, provided and made available to a WFM system. In one embodiment, this is through an application programming interface (API). In one embodiment, the Work Sessions Report described above is accessible via a Reporting API, where the data is available under the "WorkSessionsReport" metric set. In one embodiment, time filters are needed for this metric set, although it is possible for a further embodiment to exclude time filters.

In one embodiment, the data available via the Work Sessions Report is delayed by a predetermined amount of time (e.g., one hour delayed, ten-minute delayed, etc.). In the case of being delayed one hour, this means that if a user or WFM system makes an API call at 1 pm, data is given from 11 a.m.-12 p.m. Various time spans and delay times are applied or available in further embodiments.

Figure 19:
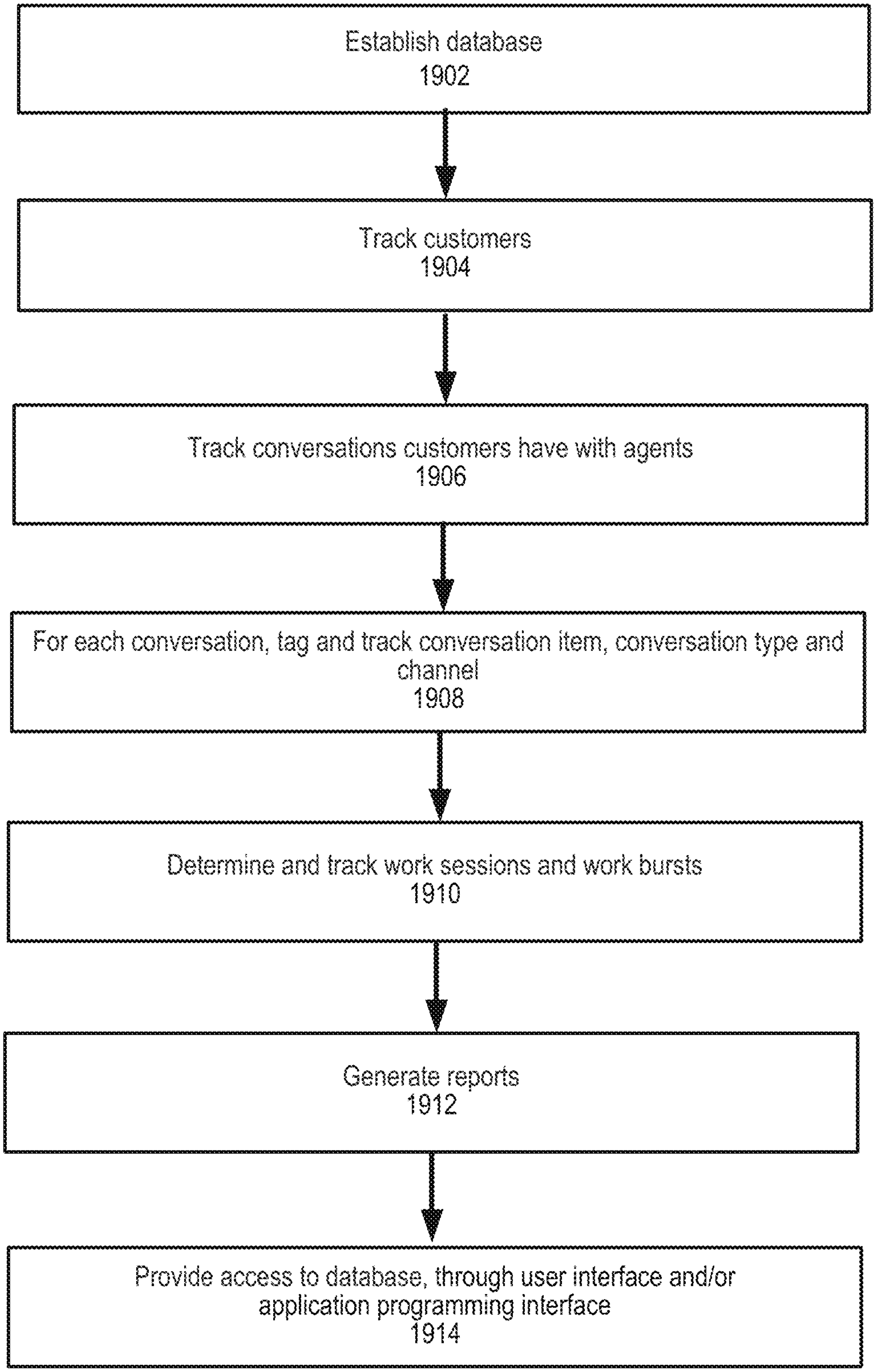
FIG. 19 illustrates a flow diagram of a method for customer-focused workforce management, which can be performed by embodiments of the workforce management system of FIG. 14.

FIG. 19 illustrates a flow diagram of a method for customer-focused workforce management, which can be performed by embodiments of the workforce management system 1410 of FIG. 14. The method can be performed by one or more processor, for example by a processor of a workforce management system.

In an action 1902, the system establishes a database. Details of a suitable database with contents are described above with reference to FIG. 15. Various types of databases may be suitable, and variations are readily devised in keeping with the teachings herein.

In an action 1904, the system tracks customers, in the database. Each customer has an associated customer profile and customer ID in the database, which the system uses for tracking.

In an action 1906, the system tracks conversations that customers have with agents, in the database. Conversations have conversation IDs and conversation items with conversation item IDs.

In an action 1908, for each conversation, the system tags and tracks conversation item (contact item), conversation type (contact type) and channel. Descriptions of these and further tags are given above with reference to FIG. 15.

In an action 1910, the system determines and tracks work sessions and work bursts, in the database. Examples of work sessions and work bursts are described above with reference to FIGS. 17A-17D.

In an action 1912, the system generates reports. Examples of work session reports and work burst reports are described above, with reference to FIGS. 17A-17D and FIG. 18.

In an action 1914, the system provides access to the database, through a user interface and/or application programming interface. An example of a suitable user interface for use by agents is described above with reference to FIG. 16, and variations thereof are readily devised in keeping with the teachings herein. Details of a suitable API for use by users or further WFM systems are described above, an API is depicted in FIG. 14, and variations and further details thereof are readily devised.

There is a number of example embodiments described herein.

Example 1 is method generating data for workforce management, performed by a processor-based system, comprising: identifying one or more contact items within each conversation of one or more conversations, the one or more conversations being between one or more customers of a plurality of customers contacting a contact center and one or more agents associated with the contact center; tagging each contact item of the one or more contact items with a contact type and a channel type, including selecting the channel type from a plurality of channel types; and tracking periods of agent activity for each channel for each of the one or more agents using the tagging of the contact items for one or more work sessions.

Example 2 is method of example 1 that may optionally include that at least one conversation with one customer includes multiple channels at one time.

Example 3 is method of example 2 that may optionally include that tagging and tracking of work occur for each of the multiple channels at once only when an agent of the one or more agents is performing agent activity to handle the one customer.

Example 4 is method of example 3 that may optionally include that the tagging and tracking occur when agent activity switches between the multiple channels.

Example 5 is method of example 1 that may optionally include sending tracked data to a workforce management system.

Example 6 is method of example 5 that may optionally include that sending tracked data to a workforce management system comprises providing access to the tracked data by, or on behalf of, the workforce management system.

Example 7 is method of example 1 that may optionally include that the contact type is one of a plurality of contact types comprising a phone call on a voice channel, a message on a messaging-based channel, an email on a mail-based channel, a video chat, and a voicemail on a voice channel or voice messaging-based channel.

Example 8 is method of example 1 that may optionally include that a work burst of one or more work bursts of the one or more work sessions is to start when an agent views a customer profile and is to end when the agent navigates away from the customer profile.

Example 9 is method of example 8 that may optionally include performing a work session calculation for each customer of the one or more customers based on the one or more work bursts associated with said each customer, excluding agent activity away for each customer in the work session calculation.

Example 10 is method of example 8 that may optionally include providing a user interface for use by the one or more agents, the user interface supporting customer profile selection and channel identification or selection and for use in identifying the one or more work bursts based on navigation to and from the customer profile as part of profile selection.

Example 11 is method of example 1 that may optionally include that a work session is to begin when a contact item begins and is to end when the contact item ends, a work session is to begin when an agent identifier changes indicating another agent is involved with a contact item, or a work session is to begin when a channel changes.

Example 12 is method of example 1 that may optionally include tagging each contact item of the one or more contact items with one or more of: a contact item identifier, a contact type, a channel, a direction, a beginning timestamp, an end timestamp, a service level agreement (SLA), a SLA fulfillment time or timestamp, whether the contact item was answered within an established SLA, a conversation routing timestamp, a status of the contact item as to answered, abandoned, unanswered, or unknown, a calculated handle time for a work session, a wrap time after a contact ends, or an agent identifier.

Example 13 is method of example 1 that may optionally include generating work session reports or work burst reports, on a per agent, per customer, per channel, or per contact center basis.

Example 14 is method of example 1 that may optionally include determining, based on the tracked data, one or more of length or size of backlog, customer wait time, agent response time, fulfillment of service level agreement (SLA), agent handle time, and overall handle time for a contact center.

Example 15 is a tangible, non-transitory, computer-readable media having instructions thereupon which, when executed by a processor, cause the processor to perform operations comprising: identifying one or more contact items within each conversation of one or more conversations, the one or more conversations being between one or more customers of a plurality of customers contacting a contact center and one or more agents associated with the contact center; tagging each contact item of the one or more contact items with a contact type and a channel type, including selecting the channel type from a plurality of channel types; and tracking periods of agent activity for each channel for each of the one or more agents using the tagging of the contact items for one or more work sessions.

Example 16 is media of example 15 that may optionally include that at least one conversation with one customer includes multiple channels at one time.

Example 17 is media of example 16 that may optionally include that tagging and tracking of work occur for each of the multiple channels at once only when an agent of the one or more agents is performing agent activity to handle the one customer.

Example 18 is media of example 17 that may optionally include that the tagging and tracking occur when agent activity switches between the multiple channels.

Example 19 is media of example 15 that may optionally include that the method further comprises sending tracked data to a workforce management system.

Example 20 is media of example 15 that may optionally include that the sending the tracked data to the workforce management system comprises providing access to the tracked data by, or on behalf of, the workforce management system.

Example 21 is media of example 15 that may optionally include that the contact type is one of a plurality of contact types comprising a phone call on a voice channel, a message on a messaging-based channel, an email on a mail-based channel, a video chat, and a voicemail on a voice channel or voice messaging-based channel.

Example 22 is media of example 15 that may optionally include that a work burst of the one or more work bursts is to start when an agent views a customer profile and is to end when the agent navigates away from the customer profile.

Example 23 is media of example 22 that may optionally include that the operations further comprise: providing a user interface for use by the one or more agents, the user interface supporting customer profile selection and channel identification or selection and for use in identifying the one or more work bursts based on navigation to and from the customer profile as part of profile selection.

Example 24 is media of example 15 that may optionally include that a work session is to begin when a contact item begins and is to end when the contact item ends, agent identifier changes, inbox identifier changes, item identifier changes, conversation identifier changes, or channel changes.

Example 25 is media of example 15 that may optionally include that the operations further comprise: tagging each contact item of the one or more contact items with one or more of: a contact item identifier, a contact type, a channel, a direction, a beginning timestamp, an end timestamp, a service level agreement (SLA), a SLA fulfillment time or timestamp, whether the contact item was answered within an established SLA, a conversation routing timestamp, a status of the contact item as to answered, abandoned, unanswered, or unknown, a calculated handle time for a work session, a wrap time after a contact ends, or an agent identifier.

Example 26 is a system comprising: a database, in a memory; and one or more processors, to: identify one or more contact items within each conversation of one or more conversations, the one or more conversations being between one or more customers of a plurality of customers contacting a contact center and one or more agents associated with the contact center; tag each contact item of the one or more contact items with a contact type and a channel type, including selecting the channel type from a plurality of channel types; and track periods of agent activity for each channel for each of the one or more agents using the tagging of the contact items for one or more work sessions.

Example 27 is system of example 26 that may optionally include that at least one conversation with one customer includes multiple channels at one time.

Example 28 is system of example 27 that may optionally include that the one or more processors are operable to tag and track work occur for each of the multiple channels at once only when an agent of the one or more agents is performing agent activity to handle the one customer.

Example 29 is system of example 28 that may optionally include that the one or more processors are operable to perform tagging and tracking occur when agent activity switches between the multiple channels.

Example 30 is system of example 26 that may optionally include that the one or more processors are operable to send tracked data to a workforce management system.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

In the foregoing specification, the invention has been described with reference to specific exemplary embodiments thereof. It will, however, be evident that various modifications and changes may be made thereto without departing from the broader spirit and scope of disclosed embodiments. The specification and drawings are, accordingly, to be regarded in an illustrative rather than a restrictive sense.

What is claimed is:

1. A method for improving workforce management by utilizing a hierarchical data structure of a computing system to monitor multi-channel customer-agent interactions in real time and to provide non-duplicated data as an input for functions performed by a computing device, comprising:

receiving, by a computing system processor, incoming communications from one or more customers on a plurality of communication channels and routing the incoming communications to one or more agents associated with a contact center, wherein receiving the incoming communications from the one or more customers on the plurality of communication channels includes receiving simultaneously two or more communications from a customer on two or more communication channels of the plurality of communication channels;

detecting, a channel transition request indicating a customer desire to switch a communication from a current communication channel to a different communication channel;

automatically routing the communication on the different communication channel to a same agent handling the communication on the current communication channel, wherein a new work session record keyed to an agent identifier, a customer identifier, and the different communication channel is created in the hierarchical data structure in response to the channel transition;

in response to the routing, updating the hierarchical data structure stored in a database, the hierarchical data structure organizing tracked data at a plurality of levels comprising at least: a customer level keyed to the customer identifier, a conversation level keyed to a conversation identifier and associated with the customer identifier, a contact item level keyed to a contact item identifier within each conversation and tagged with a contact type and a channel type, a work session level in which each work session record corresponds to an agent-customer-channel combination of the agent identifier, the customer identifier, and a single channel type, and a work burst level in which each work burst record is associated with a work session record and comprises a start timestamp and an end timestamp corresponding to a period of agent activity;

identifying one or more contact items within each conversation of one or more conversations on the plurality of communication channels and being between the one or more customers of a plurality of customers contacting the contact center and the one or more agents, wherein identifying one or more contact items within each conversation of the one or more conversations comprises identifying contact items associated with the two or more communications simultaneously received from the customer on the two or more communication channels;

tagging, by the computing system processor and based on the hierarchical data structure, each contact item of the one or more contact items with the contact type and the channel type, including selecting the channel type from a plurality of channel types, wherein tagging each contact item of the one or more contact items includes tagging each contact items associated with the two or more communications simultaneously received from the customer on the two or more communication channels;

tracking, by the computing system processor and based on the hierarchical data structure, periods of time of agent activity for each channel of the plurality of communication channels for each of the one or more agents using the tagging of the contact items for the one or more work sessions and for one or more work bursts, each work burst of the one or more work bursts in each contact item being a time period of agent activity in said each contact item with consecutive work bursts of said each contact item being separated by a time period gap of no agent activity while a communication session continues on said each contact item's associated communication channel;

tracking, by the computing system processor and based on the hierarchical data structure, tagged conversations, each tagged conversation centric on a customer and an issue to be resolved, wherein the computing system processor groups multiple customer-agent communications on multiple communication channels, using contact item tagging and agent activity tracking to form a tagged conversation, for at least one of the tracked tagged conversations comprising one open conversation as one tagged conversation having multiple active conversation items or contacts occurring in the two or more communications simultaneously received from the customer on the two or more communication channels;

monitoring, by the computing system processor, work burst data to detect an initiation of a work session when an agent views a profile of the customer;

triggering system initiation of a timestamped data capture process configured to monitor activity of the agent upon detecting the initiation of the work session;

accessing the database, by the computing system processor and based on the initiation of the work session, to identify the multiple active conversation items occurring in the two or more communications simultaneously received from the customer on the two or more communication channels;

identifying, by the computing system processor based on the multiple active conversation items, a work session channel type based on how synchronous each channel type is, wherein a voice channel type is more synchronous than a messaging channel type, and the messaging channel type is more synchronous than a mail channel type;

assigning, by the computing system processor, the identified work session channel type to the work session associated with the conversation, wherein the assigned channel type corresponds to a most synchronous channel type among the channel types within the conversation;

triggering system termination of the timestamped data capture process upon detecting the agent has navigated away from the customer profile;

deriving, by the computing system processor and based on the hierarchical data structure, non-duplicated data, based on such tagging and tracking, to a granularity of work sessions and/or work bursts per agent, customer, and/or channel, to support work session reports and/or work burst reports on an agent, customer, or combination thereof, wherein deriving the non-duplicated data comprises determining, using the tagging of work bursts and work sessions, a handle time representing time worked by each agent for each customer on each channel for each customer-agent conversation, the handle time being a combination of time periods representing work bursts for each contact item combined into a work session while removing any time period gaps of no agent activity while a communication session continues on said each contact item's associated communication channel, wherein, because each work session record in the hierarchical data structure corresponds to an agent-customer-channel combination of the agent identifier, the customer identifier, and the single channel type assigned based on a synchronicity hierarchy in which voice is more synchronous than messaging and messaging is more synchronous than mail, the handle time for each work session is derived by summing durations of only the work burst records associated with that work session record, thereby producing the non-duplicated data in which agent work across the two or more simultaneously active communication channels is tracked per channel without double-counting time periods during which the agent concurrently handles the two or more communications from the customer; and transmitting, by the computing system processor and via a communication network, the non-duplicated data to the computing device for storing, processing of work metrics, and display.

2. The method of claim 1, wherein at least one conversation with one customer includes multiple communication channels at one time.

3. The method of claim 2, wherein tagging and tracking of work occur for each of the multiple communication channels at once only when an agent of the one or more agents is performing agent activity to handle the one customer.

4. The method of claim 3 wherein the tagging and tracking occur when agent activity switches between the multiple communication channels.

5. The method of claim 1, further comprising sending tracked data to a workforce management system.

6. The method of claim 5, wherein sending tracked data to a workforce management system comprises providing access to the tracked data by, or on behalf of, the workforce management system.

7. The method of claim 1, wherein the contact type is one of a plurality of contact types comprising a phone call on a voice channel, a message on a messaging-based channel, an email on a mail-based channel, a video chat, and a voicemail on a voice channel or voice messaging-based channel.

8. The method of claim 1, wherein a work burst of the one or more work bursts of the one or more work sessions is to start when an agent views a customer profile and is to end when the agent navigates away from the customer profile.

9. The method of claim 8, further comprising:

performing a work session calculation for each customer of the one or more customers based on the one or more work bursts associated with said each customer, excluding agent activity away for each customer in the work session calculation.

10. The method of claim 8, further comprising:

providing a user interface for use by the one or more agents, the user interface supporting customer profile selection and channel identification or selection and for use in identifying the one or more work bursts based on navigation to and from the customer profile as part of profile selection.

11. The method of claim 1, wherein a work session is to begin when a contact item begins and is to end when the contact item ends, a work session is to begin when an agent identifier changes indicating another agent is involved with a contact item, or a work session is to begin when a channel changes.

12. The method of claim 1, further comprising:

tagging each contact item of the one or more contact items with one or more of: a contact item identifier, a contact type, a channel, a direction, a beginning timestamp, an end timestamp, a service level agreement (SLA), a SLA fulfillment time or timestamp, whether the contact item was answered within an established SLA, a conversation routing timestamp, a status of the contact item as to answered, abandoned, unanswered, or unknown, a wrap time after a contact ends, or an agent identifier.

13. The method of claim 1, further comprising:

generating work session reports or work burst reports, on a per agent, per customer, per channel, or per contact center basis.

14. The method of claim 1, further comprising: determining, based on the tracked data, one or more of length or size of backlog, customer wait time, agent response time, fulfillment of service level agreement (SLA), agent handle time, and overall handle time for a contact center.

15. A tangible, non-transitory, computer-readable media having instructions thereupon which, when executed by a computing system processor, cause the computing system processor to perform operations comprising:

receiving, by a computing system processor, incoming communications from one or more customers on a plurality of communication channels and routing the incoming communications to one or more agents associated with a contact center, wherein receiving the incoming communications from the one or more customers on the plurality of communication channels includes receiving simultaneously two or more communications from a customer on two or more communication channels of the plurality of communication channels;

detecting, a channel transition request indicating a customer desire to switch a communication from a current communication channel to a different communication channel;

automatically routing the communication on the different communication channel to a same agent handling the communication on the current communication channel, wherein a new work session record keyed to an agent identifier, a customer identifier, and the different communication channel is created in the hierarchical data structure in response to the channel transition;

in response to the routing, updating the hierarchical data structure stored in a database, the hierarchical data structure organizing tracked data at a plurality of levels comprising at least: a customer level keyed to the customer identifier, a conversation level keyed to a conversation identifier and associated with the customer identifier, a contact item level keyed to a contact item identifier within each conversation and tagged with a contact type and a channel type, a work session level in which each work session record corresponds to an agent-customer-channel combination of the agent identifier, the customer identifier, and a single channel type, and a work burst level in which each work burst record is associated with a work session record and comprises a start timestamp and an end timestamp corresponding to a period of agent activity;

identifying one or more contact items within each conversation of one or more conversations on the plurality of communication channels and being between the one or more customers of a plurality of customers contacting the contact center and the one or more agents, wherein identifying one or more contact items within each conversation of the one or more conversations comprises identifying contact items associated with the two or more communications simultaneously received from the customer on the two or more communication channels;

tagging, by the computing system processor and based on the hierarchical data structure, each contact item of the one or more contact items with the contact type and the channel type, including selecting the channel type from a plurality of channel types, wherein tagging each contact item of the one or more contact items includes tagging each contact items associated with the two or more communications simultaneously received from the customer on the two or more communication channels;

tracking, by the computing system processor and based on the hierarchical data structure, periods of time of agent activity for each channel of the plurality of communication channels for each of the one or more agents using the tagging of the contact items for the one or more work sessions and for one or more work bursts, each work burst of the one or more work bursts in each contact item being a time period of agent activity in said each contact item with consecutive work bursts of said each contact item being separated by a time period gap of no agent activity while a communication session continues on said each contact item's associated communication channel;

tracking, by the computing system processor and based on the hierarchical data structure, tagged conversations, each tagged conversation centric on a customer and an issue to be resolved, wherein the computing system processor groups multiple customer-agent communications on multiple communication channels, using contact item tagging and agent activity tracking to form a tagged conversation, for at least one of the tracked tagged conversations comprising one open conversation as one tagged conversation having multiple active conversation items or contacts occurring in the two or more communications simultaneously received from the customer on the two or more communication channels;

monitoring, by the computing system processor, work burst data to detect an initiation of a work session when an agent views a profile of the customer;

triggering system initiation of a timestamped data capture process configured to monitor activity of the agent upon detecting the initiation of the work session;

accessing the database, by the computing system processor and based on the initiation of the work session, to identify the multiple active conversation items occurring in the two or more communications simultaneously received from the customer on the two or more communication channels;

identifying, by the computing system processor based on the multiple active conversation items, a work session channel type based on how synchronous each channel type is, wherein a voice channel type is more synchronous than a messaging channel type, and the messaging channel type is more synchronous than a mail channel type;

assigning, by the computing system processor, the identified work session channel type to the work session associated with the conversation, wherein the assigned channel type corresponds to a most synchronous channel type among the channel types within the conversation;

triggering system termination of the timestamped data capture process upon detecting the agent has navigated away from the customer profile;

deriving, by the computing system processor and based on the hierarchical data structure, non-duplicated data, based on such tagging and tracking, to a granularity of work sessions and/or work bursts per agent, customer, and/or channel, to support work session reports and/or work burst reports on an agent, customer, or combination thereof, wherein deriving the non-duplicated data comprises determining, using the tagging of work bursts and work sessions, a handle time representing time worked by each agent for each customer on each channel for each customer-agent conversation, the handle time being a combination of time periods representing work bursts for each contact item combined into a work session while removing any time period gaps of no agent activity while a communication session continues on said each contact item's associated communication channel, wherein, because each work session record in the hierarchical data structure corresponds to an agent-customer-channel combination of the agent identifier, the customer identifier, and the single channel type assigned based on a synchronicity hierarchy in which voice is more synchronous than messaging and messaging is more synchronous than mail, the handle time for each work session is derived by summing durations of only the work burst records associated with that work session record, thereby producing the non-duplicated data in which agent work across the two or more simultaneously active communication channels is tracked per channel without double-counting time periods during which the agent concurrently handles the two or more communications from the customer; and transmitting, by the computing system processor and via a communication network, the non-duplicated data to the computing device for storing, processing of work metrics, and display.

16. The media of claim 15, wherein at least one conversation with one customer includes multiple communication channels at one time.

17. The media of claim 16, wherein tagging and tracking of work occur for each of the multiple communication channels at once only when an agent of the one or more agents is performing agent activity to handle the one customer.

18. The media of claim 17 wherein the tagging and tracking occur when agent activity switches between the multiple communication channels.

19. The media of claim 15, wherein the operations further comprise sending tracked data to a workforce management system.

20. The media of claim 19, wherein the sending the tracked data to the workforce management system comprises providing access to the tracked data by, or on behalf of, the workforce management system.

21. The media of claim 15, wherein the contact type is one of a plurality of contact types comprising a phone call on a voice channel, a message on a messaging-based channel, an email on a mail-based channel, a video chat, and a voicemail on a voice channel or voice messaging-based channel.

22. The media of claim 15, wherein a work burst of the one or more work bursts is to start when an agent views a customer profile and is to end when the agent navigates away from the customer profile.

23. The media of claim 22, wherein the operations further comprise:

providing a user interface for use by the one or more agents, the user interface supporting customer profile selection and channel identification or selection and for use in identifying the one or more work bursts based on navigation to and from the customer profile as part of profile selection.

24. The media of claim 15, wherein a work session is to begin when a contact item begins and is to end when the contact item ends, agent identifier changes, inbox identifier changes, item identifier changes, conversation identifier changes, or channel changes.

25. The media of claim 15, wherein the operations further comprise:

tagging each contact item of the one or more contact items with one or more of: a contact item identifier, a contact type, a channel, a direction, a beginning timestamp, an end timestamp, a service level agreement (SLA), a SLA fulfillment time or timestamp, whether the contact item was answered within an established SLA, a conversation routing timestamp, a status of the contact item as to answered, abandoned, unanswered, or unknown, a wrap time after a contact ends, or an agent identifier.

26. A computing system, comprising:

a database, in a memory; and a computing system processors, to:

receive, by a computing system processor, incoming communications from one or more customers on a plurality of communication channels and route the incoming communications to one or more agents associated with a contact center, wherein receiving the incoming communications from the one or more customers on the plurality of communication channels includes receiving simultaneously two or more communications from a customer on two or more communication channels of the plurality of communication channels;

detecting, a channel transition request indicating a customer desire to switch a communication from a current communication channel to a different communication channel;

automatically routing the communication on the different communication channel to a same agent handling the communication on the current communication channel, wherein a new work session record keyed to an agent identifier, a customer identifier, and the different communication channel is created in the hierarchical data structure in response to the channel transition;

in response to the routing, updating the hierarchical data structure stored in a database, the hierarchical data structure organizing tracked data at a plurality of levels comprising at least: a customer level keyed to the customer identifier, a conversation level keyed to a conversation identifier and associated with the customer identifier, a contact item level keyed to a contact item identifier within each conversation and tagged with a contact type and a channel type, a work session level in which each work session record corresponds to an agent-customer-channel combination of the agent identifier, the customer identifier, and a single channel type, and a work burst level in which each work burst record is associated with a work session record and comprises a start timestamp and an end timestamp corresponding to a period of agent activity;

identifying one or more contact items within each conversation of one or more conversations on the plurality of communication channels and being between the one or more customers of a plurality of customers contacting the contact center and the one or more agents, wherein identifying one or more contact items within each conversation of the one or more conversations comprises identifying contact items associated with the two or more communications simultaneously received from the customer on the two or more communication channels;

tagging, by the computing system processor and based on the hierarchical data structure, each contact item of the one or more contact items with the contact type and the channel type, including selecting the channel type from a plurality of channel types, wherein tagging each contact item of the one or more contact items includes tagging each contact items associated with the two or more communications simultaneously received from the customer on the two or more communication channels;

track, by the computing system processor and based on the hierarchical data structure, periods of time of agent activity for each channel of the plurality of communication channels for each of the one or more agents using the tagging of the contact items for the one or more work sessions and for one or more work bursts, each work burst of the one or more work bursts in each contact item being a time period of agent activity in said each contact item with consecutive work bursts of said each contact item being separated by a time period gap of no agent activity while a communication session continues on said each contact item's associated communication channel;

track, by the computing system processor and based on the hierarchical data structure, tagged conversations, each tagged conversation centric on a customer and an issue to be resolved, wherein the computing system processor groups multiple customer-agent communications on multiple communication channels, using contact item tagging and agent activity tracking to form a tagged conversation, for at least one of the tracked tagged conversations comprising one open conversation as one tagged conversation having multiple active conversation items or contacts occurring in the two or more communications simultaneously received from the customer on the two or more communication channels;

monitor, by the computing system processor, work burst data to detect an initiation of a work session when an agent views a profile of the customer;

trigger system initiation of a timestamped data capture process configured to monitor activity of the agent upon detecting the initiation of the work session;

access the database, by the computing system processor and based on the initiation of the work session, to identify the multiple active conversation items occurring in the two or more communications simultaneously received from the customer on the two or more communication channels;

identify, by the computing system processor based on the multiple active conversation items, a work session channel type based on how synchronous each channel type is, wherein a voice channel type is more synchronous than a messaging channel type, and the messaging channel type is more synchronous than a mail channel type;

assign, by the computing system processor, the identified work session channel type to the work session associated with the conversation, wherein the assigned channel type corresponds to a most synchronous channel type among the channel types within the conversation;

trigger system termination of the timestamped data capture process upon detecting the agent has navigated away from the customer profile;

derive, by the computing system processor and based on the hierarchical data structure, non-duplicated data, based on such tagging and tracking, to a granularity of work sessions and/or work bursts per agent, customer, and/or channel, to support work session reports and/or work burst reports on an agent, customer, or combination thereof, wherein deriving the non-duplicated data comprises determining, using the tagging of work bursts and work sessions, a handle time representing time worked by each agent for each customer on each channel for each customer-agent conversation, the handle time being a combination of time periods representing work bursts for each contact item combined into a work session while removing any time period gaps of no agent activity while a communication session continues on said each contact item's associated communication channel, wherein, because each work session record in the hierarchical data structure corresponds to an agent-customer-channel combination of the agent identifier, the customer identifier, and the single channel type assigned based on a synchronicity hierarchy in which voice is more synchronous than messaging and messaging is more synchronous than mail, the handle time for each work session is derived by summing durations of only the work burst records associated with that work session record, thereby producing the non-duplicated data in which agent work across the two or more simultaneously active communication channels is tracked per channel without double-counting time periods during which the agent concurrently handles the two or more communications from the customer; and transmitting, by the computing system processor and via a communication network, the non-duplicated data to the computing device for storing, processing of work metrics, and display.

27. The system of claim 26, wherein at least one conversation with one customer includes multiple communication channels at one time.

28. The system of claim 27, wherein the one or more processors are operable to tag and track work occur for each of the multiple communication channels at once only when an agent of the one or more agents is performing agent activity to handle the one customer.

29. The system of claim 28 wherein the one or more processors are operable to perform tagging and tracking occur when agent activity switches between the multiple communication channels.

30. The system of claim 26, wherein the one or more processors are operable to send tracked data to a workforce management system.

* * * * *